May 21, 1963 W. S. GUBELMANN 3,090,553
CARRIAGE SHIFTING AND TABULATING MECHANISMS
Original Filed Nov. 6, 1950 14 Sheets-Sheet 1

INVENTOR
William S. Gubelmann, deceased
by Walter S. Gubelmann, executor
Burgess, Ryan & Hicks
Attys.

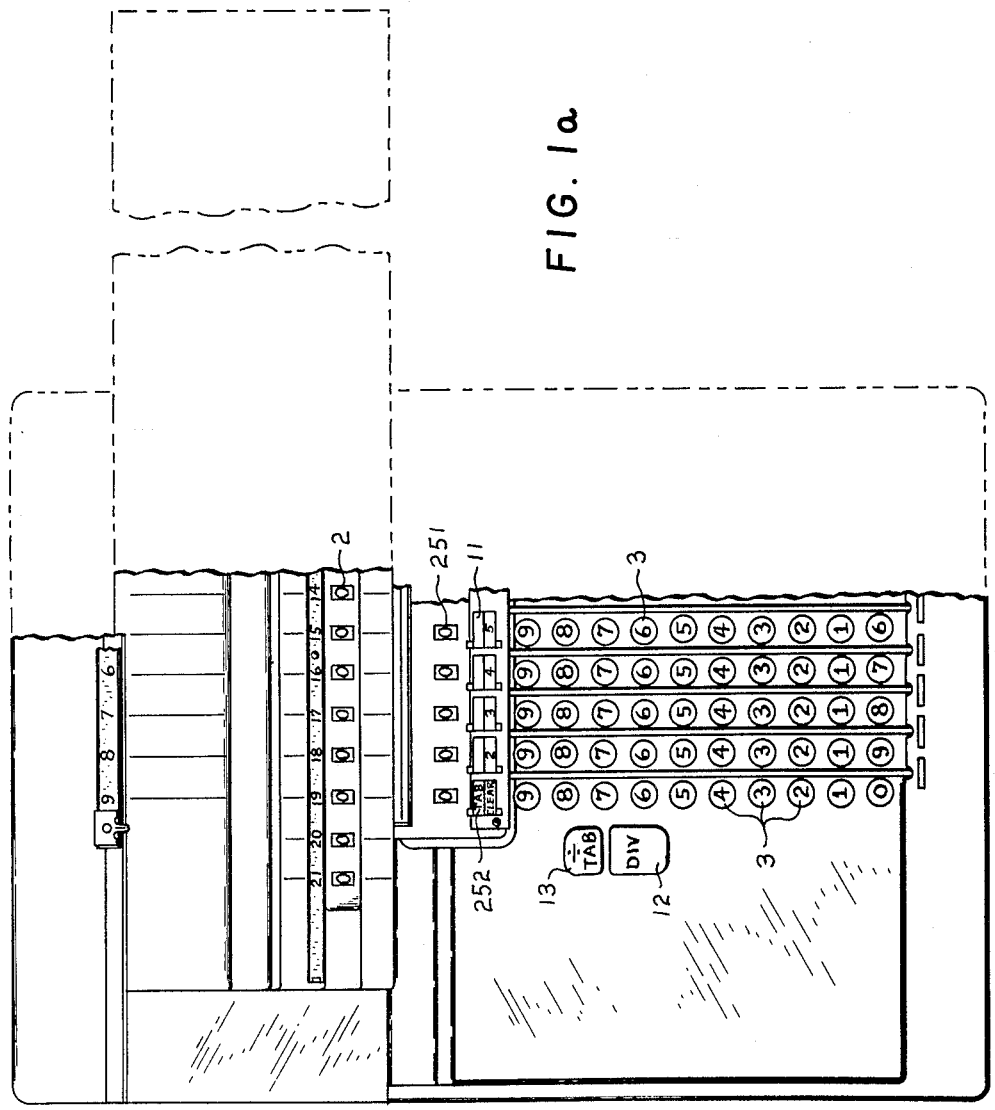

May 21, 1963   W. S. GUBELMANN   3,090,553
CARRIAGE SHIFTING AND TABULATING MECHANISMS
Original Filed Nov. 6, 1950   14 Sheets-Sheet 4

INVENTOR
William S. Gubelmann, deceased
by Walter S. Gubelmann, executor
Burgess, Ryan & Hicks
attys.

May 21, 1963  W. S. GUBELMANN  3,090,553
CARRIAGE SHIFTING AND TABULATING MECHANISMS
Original Filed Nov. 6, 1950  14 Sheets-Sheet 5

INVENTOR
William S. Gubelmann, deceased
by Walter S. Gubelmann, executor
Burgess, Ryan & Hicks
Attys.

May 21, 1963 W. S. GUBELMANN 3,090,553
CARRIAGE SHIFTING AND TABULATING MECHANISMS
Original Filed Nov. 6, 1950 14 Sheets-Sheet 6
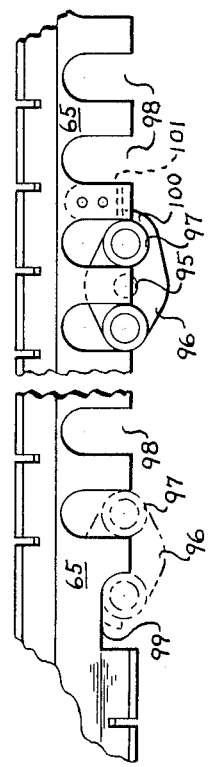
FIG. 9
FIG. 8
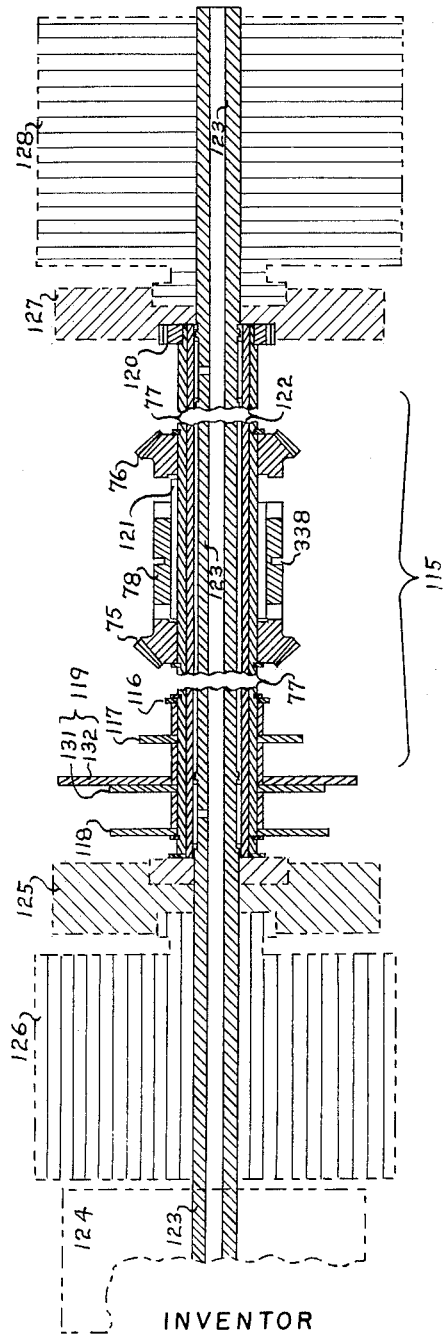
FIG. 10
INVENTOR

INVENTOR

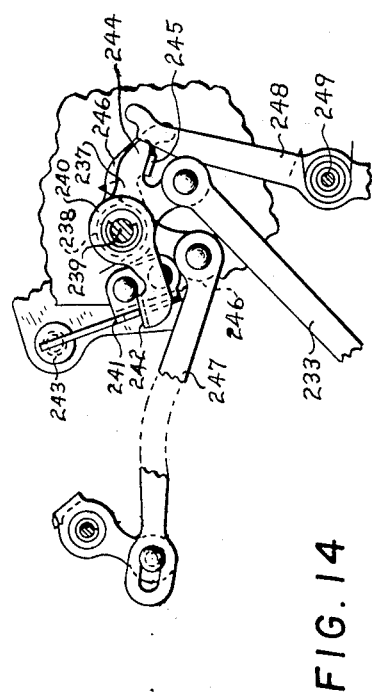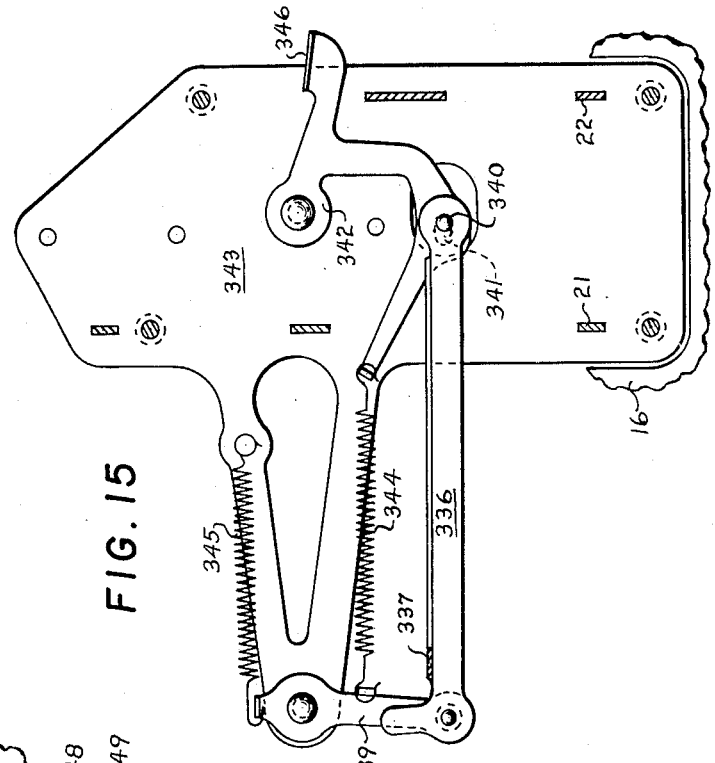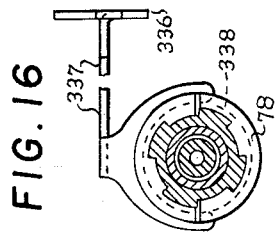

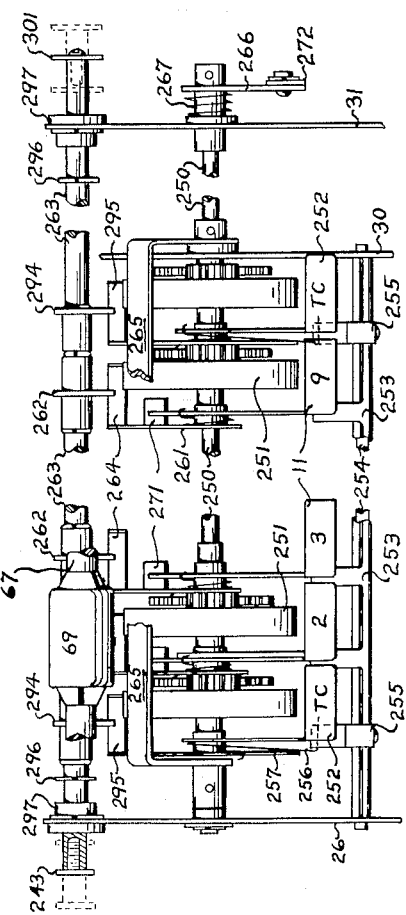

May 21, 1963  W. S. GUBELMANN  3,090,553
CARRIAGE SHIFTING AND TABULATING MECHANISMS
Original Filed Nov. 6, 1950  14 Sheets-Sheet 12

INVENTOR
William S. Gubelmann, deceased
by Walter S. Gubelmann, executor
Burgess, Ryan & Hicks
Attys.

May 21, 1963 W. S. GUBELMANN 3,090,553
CARRIAGE SHIFTING AND TABULATING MECHANISMS
Original Filed Nov. 6, 1950 14 Sheets-Sheet 13

INVENTOR
William S. Gubelmann, deceased
By Walter S. Gubelmann, executor
Burgess, Ryan Hicks
Attys.

May 21, 1963 W. S. GUBELMANN 3,090,553
CARRIAGE SHIFTING AND TABULATING MECHANISMS
Original Filed Nov. 6, 1950 14 Sheets-Sheet 14
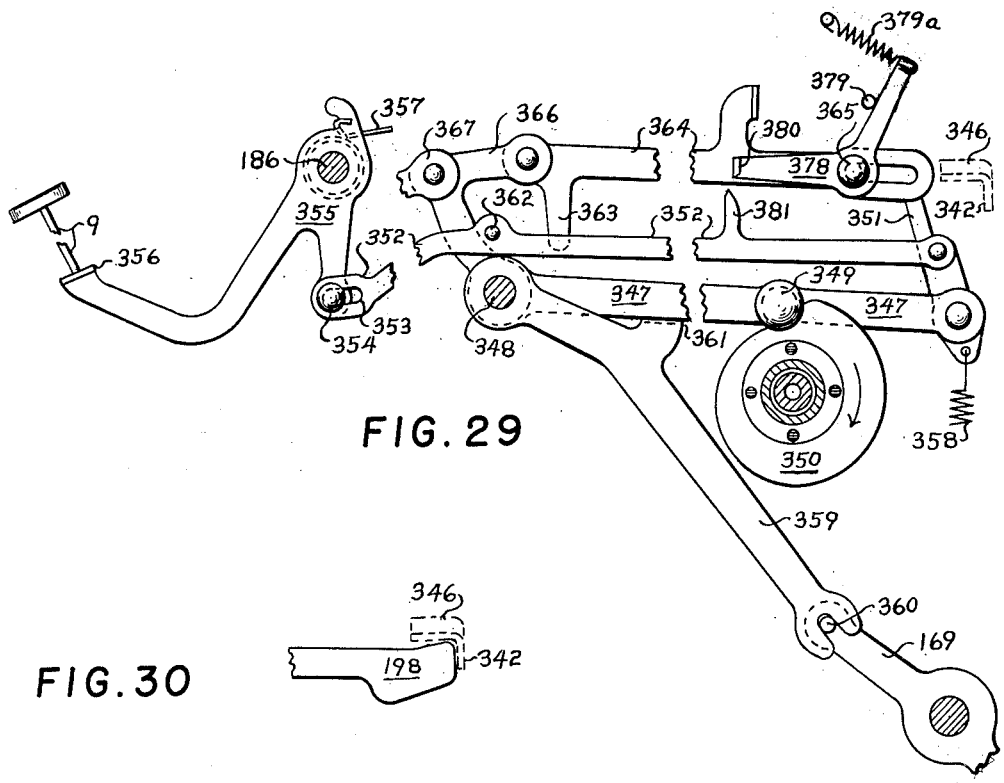
FIG. 29
FIG. 30
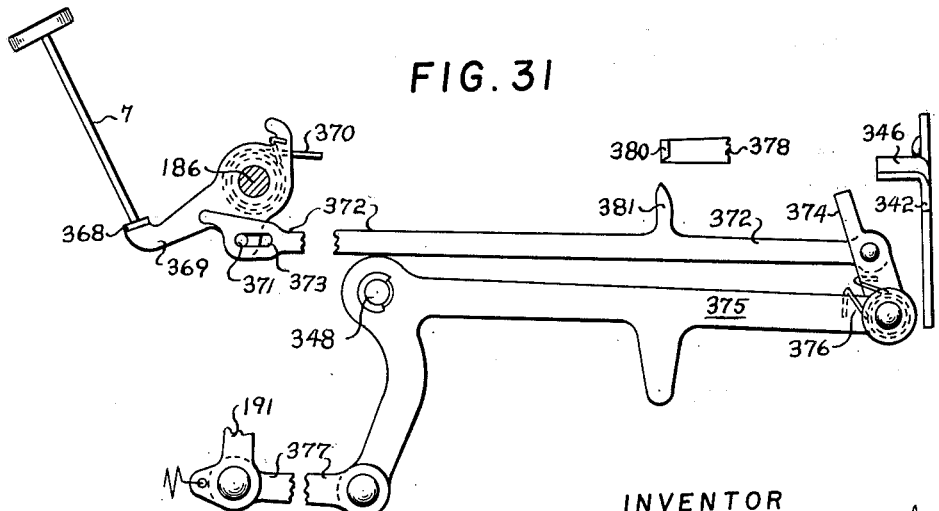
FIG. 31
INVENTOR
William S. Gubelmann, deceased
by Walter S. Gubelmann, executor
Burgess, Ryan Hicks
attys.

3,090,553
CARRIAGE SHIFTING AND TABULATING MECHANISMS
William S. Gubelmann, deceased, late of Convent, N.J., by Walter S. Gubelmann, executor, Oyster Bay, N.Y.; said Walter S. Gubelmann assignor to Realty and Industrial Corporation, a corporation of Delaware
Original application Nov. 6, 1950, Ser. No. 194,273, now Patent No. 2,969,177, dated Jan. 24, 1961. Divided and this application Oct. 31, 1960, Ser. No. 67,449
34 Claims. (Cl. 235—63)

This invention relates to machines having a shiftable carriage and has particular reference to traversing means and to tabulaing means for stopping the carriage at preselectable tabular positions.

More specifically, the invention relates to a traversing means in continuous engagement with a carriage shifted stepwise thereby and to tabulating means operable by the carriage in shifting to either end position or to a preselected intermediate position for stopping operation of the traversing means so as to stop the carriage at that particular position.

One object of the invention is to provide a machine in which there is a traversable carriage, a novel and improved carriage traversing mechanism, sturdy in construction, for rapidly moving the carriage stepwise selectively in one direction or the opposite direction.

Another object of the invention is to provide in a machine in which there is a shiftable carriage, a novel and improved carriage traversing mechanism for moving the carriage one step from one position to the next adjacent position in each cycle of operation and continuously engaging the carriage so that stopping operation of the traversing mechanism at the completion of a cycle of operation also stops the carriage simultaneously at the respective position.

Another object of the invention is to provide in a machine in which there is a shiftable carriage, a novel and improved carriage traversing mechanism in which there is a rotary member for engaging the carriage and shifting the carriage one step in each 180-degree revolution of the rotary member, first and second coaxial drive gears with a gear train between each drive gear and the rotary member for actuating the rotary member 180 degrees for each 360-degree revolution of a said drive gear, the first and second gears being for rotating the rotary member respectively in one direction and in the opposite direction, and a selectively shiftable coupling means for engaging said drive gears one at a time with a rotary power source.

Still another object of the invention is to provide in a machine in which there is a shiftable carriage, a carriage traversing mechanism in which, for overcoming initial inertial and frictional resistance, there is change-ratio gearing for providing low drive-ratios at the start of each step of shift of the carriage and providing progressively higher drive-ratios until the step of shift is completed.

Still another object of the invention is to provide a carriage traversing mechanism of the type referred to in the preceding paragraph in which the change ratio gearing comprises continuously meshed complementary scroll-type gears providing power with slow speed of rotation for starting movement of the carriage and providing progressively diminishing power with proportionally continually increasing speed of rotation as the step of movement of the carriage progresses.

A still further object of the invention is to provide in a machine having a shiftable carriage and a rotatable drive shaft, a traversing mechanism for shifting the carriage one step in each revolution of the drive shaft, the traversing mechanism comprising first and second drive gears rotatable on the drive shaft, the first drive gear, when coupled to the drive shaft, effecting shifting of the carriage in one direction, and the second drive gear, when coupled to the drive shaft, effecting shifting of the carriage in the opposite direction, and a coupling member between the drive gears and splined on the drive shaft for rotation therewith and for being slidable therealong to selectively engage one drive gear at a time, each end face of the coupling member and of the respective adjacent face of the drive gear being stepped for interfitting engagement, the spacing between the drive gears being such that sliding of the coupling member to disengage from one drive gear and engage with the other is possible only when the stepped faces of the drive gears are in mutual alignment, so that the drive gear which is not then coupled to the drive shaft rotates in a direction opposite to the direction of rotation of the coupled drive gear, and a stop-start means operable for initiating operation of the drive shaft and for effectively stopping the drive shaft at the completion of any 360-degree revolution thereof.

Another object of the invention is to provide in a calculating machine having an ordinally shiftable register carriage, a novel and improved tabulating mechanism selectively pre-settable for effecting stopping of the carriage at any desired start position in multiplying computation operations and for effecting stopping of all machine operations when a predetermined number of quotient digits, which may be less then capacity, are obtained in a division computation.

Still another object of the invention is to provide in a machine having a shiftable carriage, and a traversing mechanism for moving the carriage in one direction or in the opposite direction from one position to the next adjacent position in each cycle of operation, a novel and improved tabulating mechanism which is always operable by the carriage upon shift of the carriage into either endmost position, and which is selectively pre-settable for actuation by the carriage upon shift of the carriage into any desired position intermediate the end most positions, for effecting stopping of the carriage at the completion of the shift to either the respective end-most or the preselected intermediate position.

Another object of the invention is to provide a novel and improved tabulating mechanism for a calculating machine in which there is an ordinarily shiftable register carriage, a traversing mechanism for shifting the carriage stepwise and a stop-start means operable for initiating and stopping operation of the traversing mechanism at the completion of any step of shift of the carriage, the tabulating mechanism including a plurality of tabulating key members, one for each ordinal position of the carriage between the two end most positions, each key member being individually operable and lockable in operated position, a slidable member, a stop-inducing member for each key member, the stop-inducing members being mounted on the slide member for moving therewith and for being individually rockable relative to the slide member into the path of movement of the carriage, for endwise actuation of the slide member when the carriage moves into the respective position, a spring means between each key member and its stop-inducing member, tensioned by movement of the respective key member to operated position for rocking the related stop-inducing member into the path of the carriage, a bail member common to and engaging each stop-inducing member for normally holding any stop-inducing member retracted out of the path of the carriage when the related tabulating key member is in operated position, and means connected to the bail member and responsive to optionally operable particular machine cycling keys for engaging with the traversing mechanism for movement of the bail member by the traversing mechanism to permit any pre-tensioned stop-inducing member to rock into the path of the carriage, and means actuated by movement of the slide member for operating the stop-start means to stop the traversing mechanism at the completion of the shift into the position in which the particular engaged and moved stop-inducing member is located.

Another object of the invention is to provide a tabulating mechanism of the type referred to in the preceding paragraph in which there also is a non-retractable stop-inducing member individual to and for each end-most position of the carriage and always standing in the path of the carriage, the end-most stop-inducing members being secured to the slide member for endwise movement together with the slide member and against rocking movement out of the path of the carriage, so that the tabulating mechanism is always effective to cause stopping of the carriage upon completion of the shift into either end-most carriage position.

The above and various other objects advantages and features of the invention will become apparent and more readily understood upon reference to the following disclosure. It will be apparent, however, that those skilled in the art will be enabled to apply the teachings of this disclosure to various modifications as intended to be covered by the scope of the appended claims. The specification is directed to an exemplary embodiment of the invention illustrated in the acocmpanying drawings wherein:

FIG. 1a is a fragmentary top face view similar to that of FIG. 1, but showing the carriage shifted all the way to the right;

FIG. 8 is a fragmentary view of the carriage feed bar and the means cooperating therewith to shift the carriage;

FIG. 9 is a front view of the governor in FIG. 5;

FIG. 10 is a condensed, sectioned plan view principally of the carriage power unit and of part of the drive shaft, and diagrammatically including the rest of the drive shaft, the multiplying and dividing power units, the differentials for connecting the power units with the drive shaft and the motor means for rotating the shaft;

Figure 11:
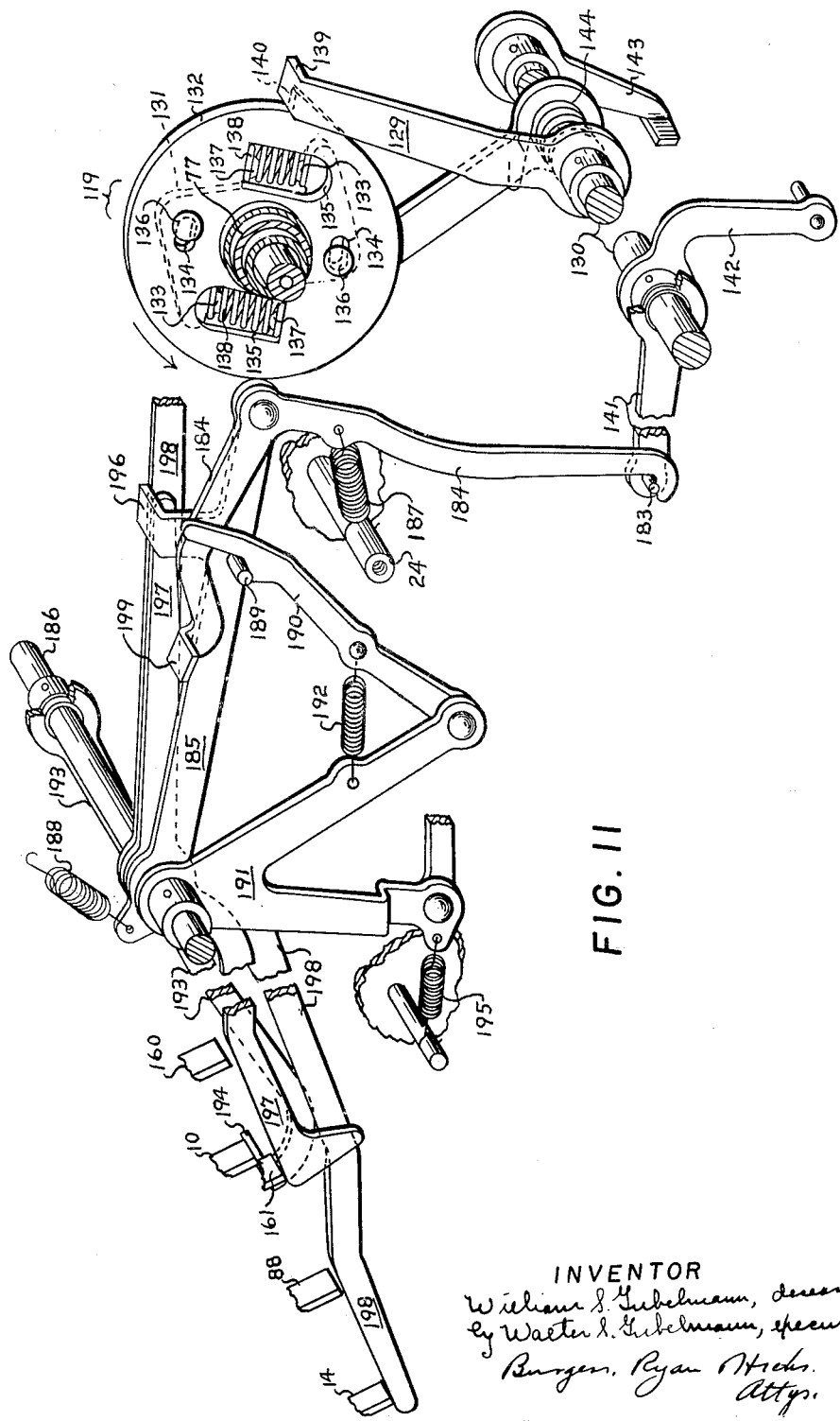
FIG. 11 is a fragmentary perspective view illustrating the carriage power unit stop-start means, several shift keys and means operable by the keys on the stop-start means for effecting shift operations.
Figure 13:
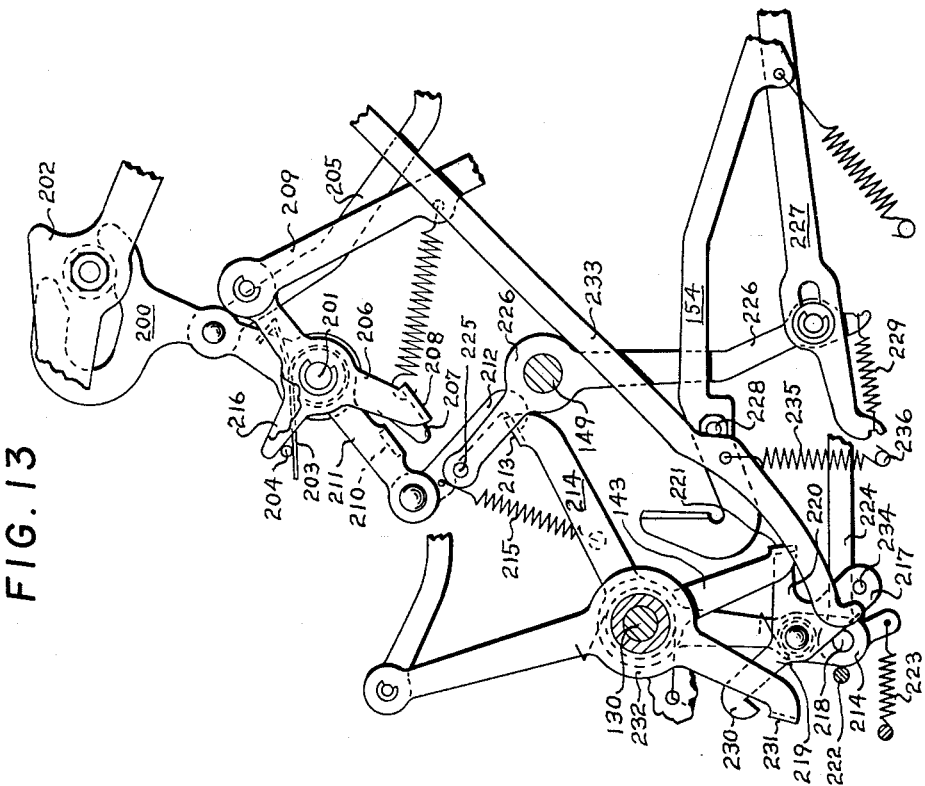
Figure 23:
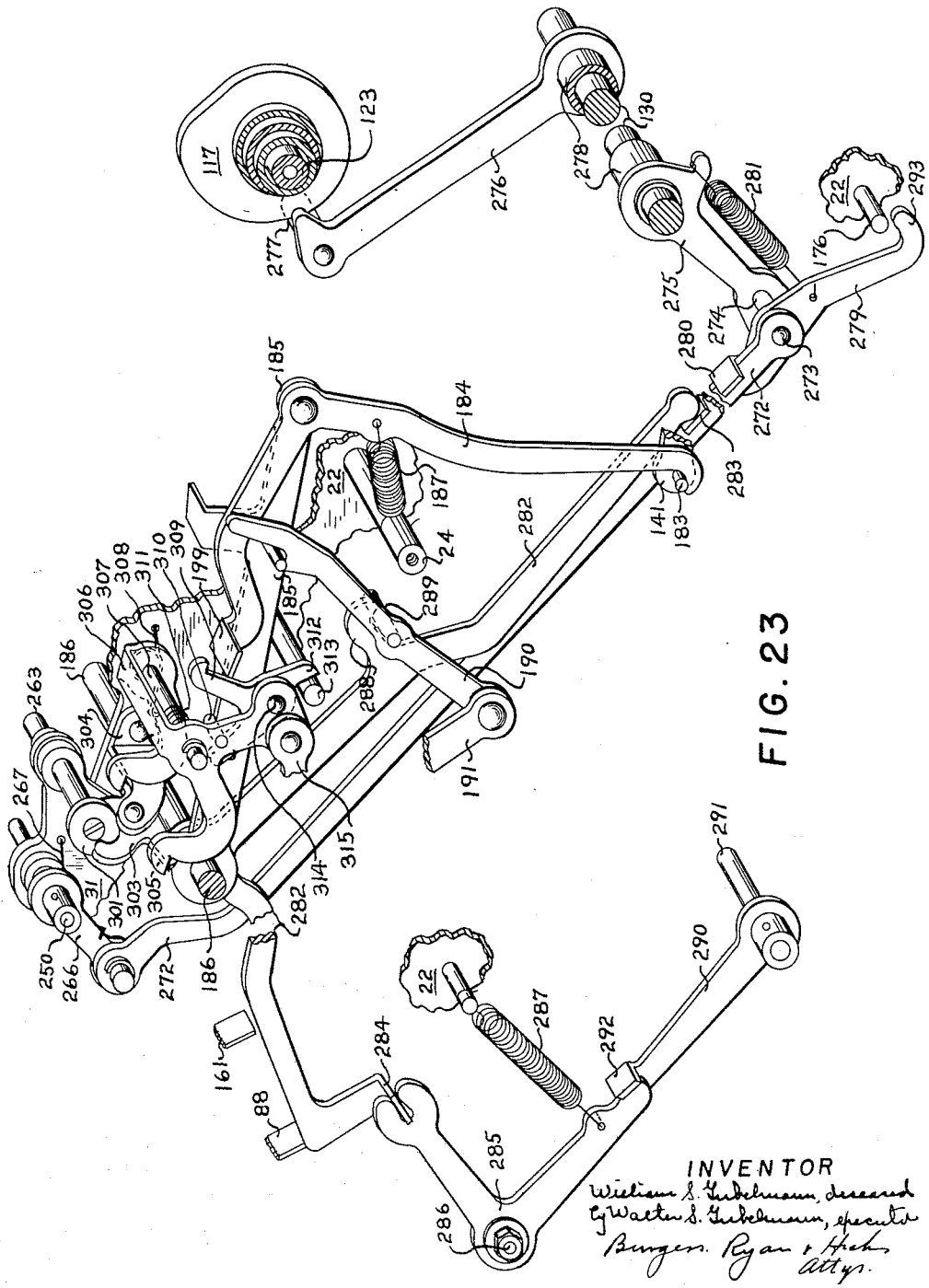
Figure 24:
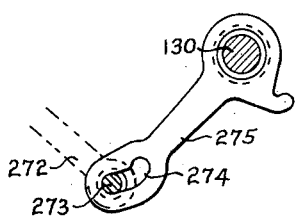
Figure 25:
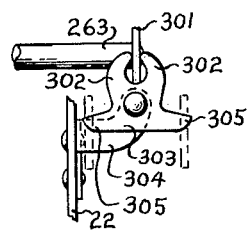
Figure 26:
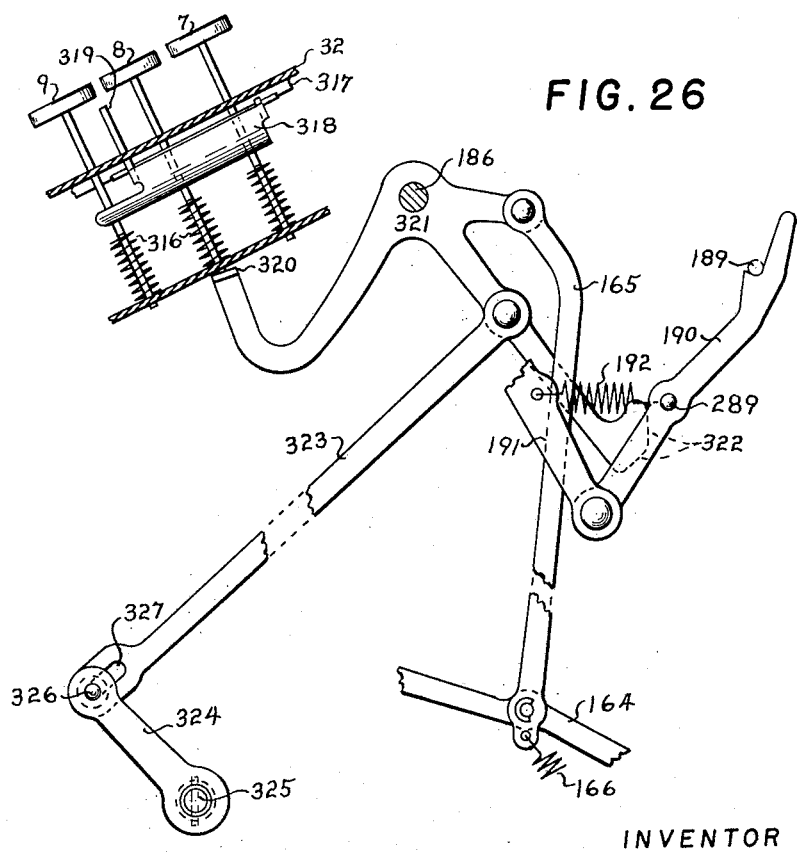
Figure 27:
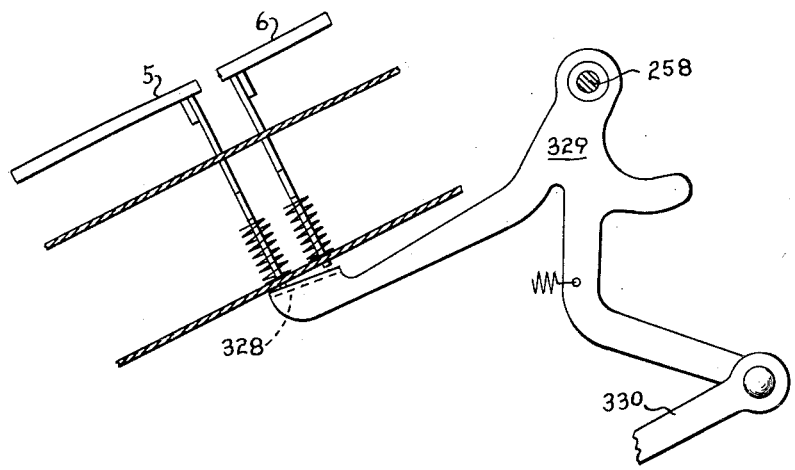
Figure 28:
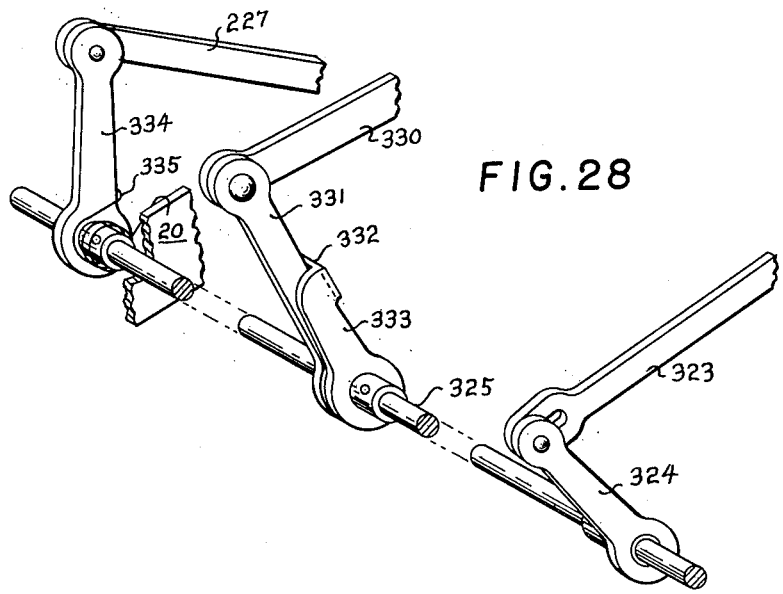

FIG. 13 is a fragmentary side elevation of control means operable on the carriage power unit stop-start means shown in FIG. 11 for effecting shift operations, including a control operable by the multiplying power unit when registration of a product is completed, another control operable by the multiplying power unit when the overdrafting amount in division is restored and the too large trial quotient value is "1," and still another control operable by the division power unit when the trial quotient is "0," also a part of the division terminating control and the non-shift control;

FIG. 14 is a fragmentary view of part of the eliminated dividend control and of the tabulating means operable on the division terminating control;

FIG. 15 is a fragmentary front view of the change shift direction means;

FIG. 16 is a side view of the change shift coupling means shiftable by the means shown in FIG. 15;

FIG. 17 is a fragmentary plan view of the tabulating means, including the selective keys and clearing keys therefor;

FIG. 18 is a sectional view of a compressible cylinder carried by the carriage for actuating the tabulating means;

FIG. 19 is a sectional view of the cylinder in FIG. 18 in its compressed state;

FIG. 20 is a fragmentary side elevation of the means for rendering the tabulating means operable at a preselected order;

FIG. 21 is a fragmentary side view showing the lowest order section of the tabulating means for causing the carriage to stop at its left extreme position and of a means for clearing any depressed tubulating key;

FIG. 22 is a fragmentary side elevation of an order of the tabulating means intermediate the extreme orders;

FIG. 23 is a fragmentary perspective illustration of means operable by several shift keys and by the division tabulation key for causing the carriage power unit to render the tubulating means operable by the carriage at a selected ordinal position, and of means operable by the tabulating means on the carriage power unit stop-start means for stopping the carriage at the preselected position;

FIG. 24 is a side view of an element of the mechanism for rendering the tabulating means operable;

FIG. 25 is a front elevation of a rocker actuatable by the tabulating means;

FIG. 26 is a fragmentary side view of the change shift and non-shift keys and of means actuated thereby to ineffectuate certain manual shift initiation operations and to operate the non-shift control shown in FIG. 13;

FIG. 27 is a side view of the add and substract keys and of means actuated thereby to operate the non-shift control in FIG. 13;

FIG. 28 is a fragmentary perspective view of connections from the means in FIGS. 26 and 27 to the non-shift control in FIG. 13;

FIG. 29 is a fragmentary side view of the change shift direction control selectively operable on the change shift direction shown in FIG. 15, as during multiplying operations;

FIG. 30 is a fragmentary side view showing the relationship between the shift direction means in FIG. 15 and the lever operable by the right shift keys in FIG. 11;

FIG. 31 is a fragmentary side view of the change shift direction control selectively operable on the change shift direction means in FIG. 15, as for returning the carriage to a start position for multiplying operations.

The specification may, for convenience, be divided into the following six major topics:
(1) General Description
(2) Carriage Shifting Mechanism
(3) Carriage Power Unit and Arresting Means
(4) Shift Initiating Controls
(5) Tabulation
(6) Shift Direction and Non-Shift Controls References in the specification to direction such as "forward," "rearward," "leftward," "rightward," etc., are with respect to the machine as viewed in FIG. 1, unless otherwise specified.

This application is a division of my copending application, Serial No. 194,273 filed Nov. 6, 1950, now Patent No. 2,969,177, for a Calculating Machine, and which has been retitled Partial Product Calculating Machine and issued as Patent No. 2,969,177 on January 24, 1961.

1. *General Description*

The machine in which the present invention is embodied is disclosed in detail in the afore-mentioned application, to which reference may be had for a complete disclosure not otherwise mentioned herein. A brief summary of the machine and its operations, however, is presented herewith in order to facilitate understanding of the invention and its inter-action with various mechanisms of the machine.

Figure 1:
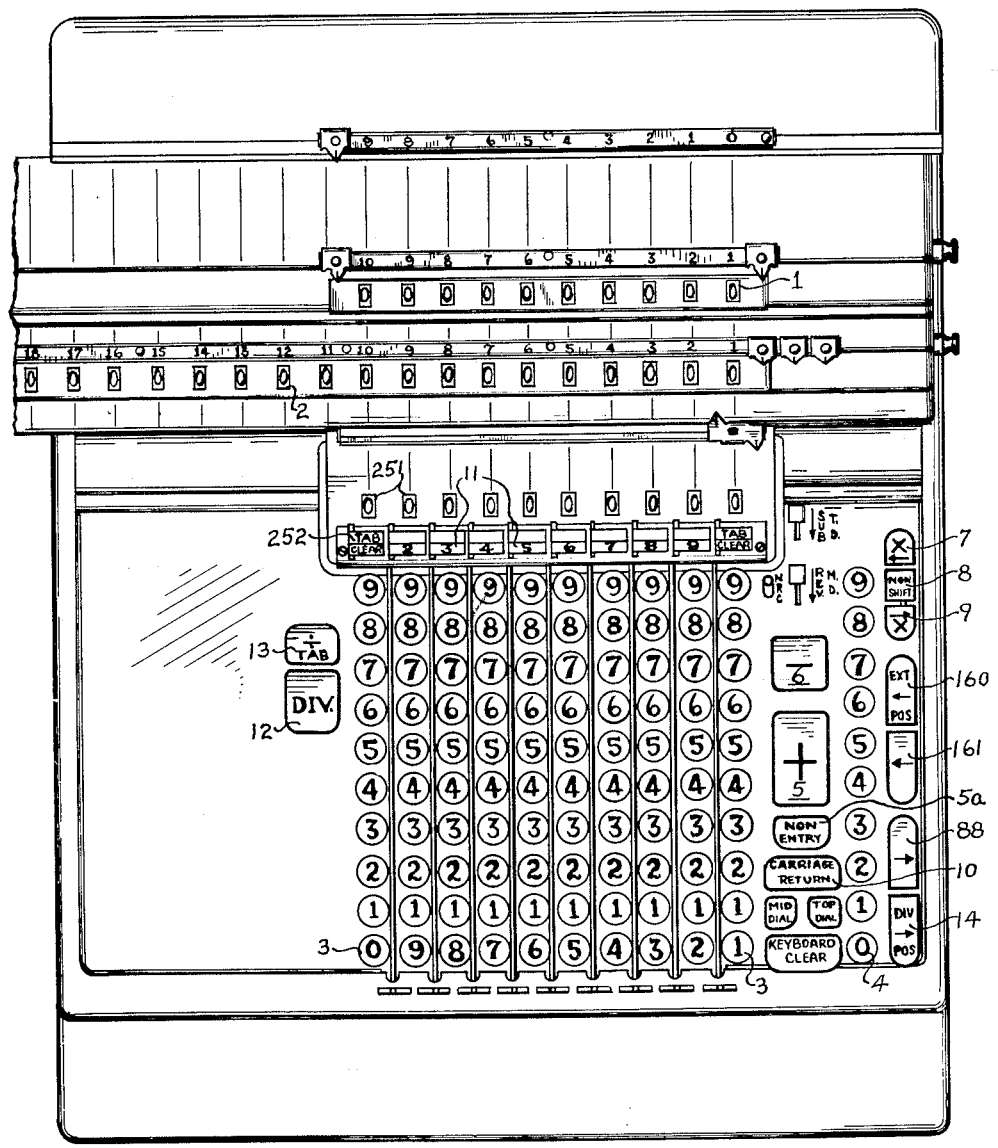
FIG. 1 is a plan view of a calculating machine embodying the invention, the carriage being shown in fragment in its leftmost position.

The machine shown in FIG. 1 is a "four-rules calculator" embodying predetermined partial product and quotient representations in a multiplying and a dividing mechanism respectively; a shiftable carriage which carries accumulator registers 1 and 2, with a carriage shifting mechanism therefor, several banks of keys 3 for setting up factors in various computations; a bank of multiplier keys 4 each of which for values 1 to 9 serves to initiate a multiplying cycle of operations; initiating keys for addition, subtraction, division and carriage shift; a tabulating mechanism; an automatically powered motor or driving mechanism, including three actuating units constantly urged rotatively by the motor for operating the multiplying, dividing and shifting mechanisms. Hereafter, each unit will be referred to respectively as the multiplying, dividing and carriage power unit or drive unit.

The machine performs the arithmetical calculations of addition, subtraction, multiplication and division automatically. Multiplication and division are direct as distinguished from repeated addition and substraction respectively.

Multiplication is direct, as distinguished from repeated addition in that the machine multiplies in a manner closely analoguous to the operational method used in mental computations. Representations of products for digits 0 to 9 multiplied by digits 1 to 9 are provided on multiplication elements or plates which are selected and set-up respectively in accordance with the separate digits of the multiplicand and each multiplier digit. The partial products thus obtained are integrated into the final product. Depression of a key 3, value 1 to 9 in a bank selects the plate bearing the products of that value multiplied by digits 1 to 9 inclusive. Each multiplier key 4 for values 1 to 9 inclusive, serves as an initiatory control for effecting operation of the computing or multiplying mechanism and exercises a control over the same for setting up the multiplicand selected multiplication element according to the value of the operated multiplier key so that the pertinent partial product on each selected plate is at a sensing position. The multiplying or computing mechanism includes means for sensing and integrating the value of the set up representations, and entry means controlled thereby for operating registers 2 and 1 to indicate the product and multiplier respectively. A cycle of multiplying operations also includes the operation of automatically initiating an ordinal shift of the carriage. Depression of the "0" value key 4 initiates an ordinal shift of the carriage without first having to excite the computing mechanism.

Addition and subtraction calculations are performed by automatically treating the factors thereof as multiplicands and multiplying the factors by "1". Add key 5 and subtract key 6 are in effect "1" value multiplier keys, but the cycles of operations instituted thereby exclude the operation of automatically initiating a shift cycle. The product thus obtained of a subtrahend is, of course, registered subtractively by the dials of the register therefor. Selective means is also provided for effecting subtractive registration of other products.

Selectively operable keys 7, 8 and 9 are provided for controlling the direction of shift or non-shift of the carriage, as for multiplication. With key 7 in depressed position, the automatic ordinal shift of the carriage will be leftward, but with key 9 in depressed position instead, the ordinal shift of the carriage will normally be rightward, as indicated by the arrows on these keys. In each instance, the carriage will shift in the opposite direction to a preselected start position with the use of Return Key 10. With key 8 in depressed position, the automatically operated shift initiating means is normally disabled. In division operations the carriage automatically moves ordinally leftward even though a key 8 or 9 is in depressed position.

The tabulating mechanism is of the type which stops the carriage at an ordinal position by directly stopping operation of the carriage power unit. The tabulating mechanism is brought into operation automatically each time the carriage shifts to either end position. A similar operation of the tabulating mechnism will also occur automatically at an intermediate ordinal position only with the use of certain shift keys, provided preselection of that position is made by depression of an appropriate one of the tabulator keys 11, which are self lockable and are releasable upon depression of a "tab clear" key at either end.

Heretofore, division computations have been performed by repeated subtraction or logarithmic processes. In this machine, division is accomplished directly by structural elements in a manner closely analogous to the method corresponding to the well known mental procedure in "long division." The mechanism used for a calculation includes representations on plate elements of predetermined quotient values for dividends from 0 to 99 divided by divisors 1 to 9, means for selecting a plate element and setting up the same, and means for deriving the trial quotient value from the set-up representation, and the dividing mechanism also makes use of the multiplying mechanism. This means that when a dividend has been set-up in register 2 and a divisor has been set-up in keys 3, upon actuation of a divide key, 12 or 13, the machine automatically selects a quotient value in accordance with the highest order of the divisor and the highest order of the dividend in the first cycle of operations and the two highest orders of the dividend remainder in each successive cycle of operations. Each selected value is the "trial quotient" value which is then entered automatically into multiplication with the divisor, and the resulting product is subtracted from the dividend in register 2. Key 12 or 13 may be depressed only when the machine is properly set-up for a division computation. The machine is prepared for such a computation as follows:

The carriage is shifted to its rightmost position, as illustrated in FIG. 1a, preferably by the depression of extreme shift key 14, FIG. 1. At this rightmost position of the carriage, FIG. 1a, the 19th dial of register 2 is then in alignment with the leftmost bank of keys 3 to receive a registration therefrom. The dividend is then set-up in the multiplicand selecting mechanism by keys 3, preferably with the highest order of the dividend in the leftmost bank of keys 3. With the use of add key 5, FIG. 1, the dividend is registered in register 2, the highest order appearing in the 19th order numeral wheel, the lower of the two highest inboard order wheels. An inboard order numeral wheel or dial is one which is in engaging relation with the entry and carry mechanism of the main body of the machine. Non-entry key 5a (FIG. 1) is depressed simultaneously with add key 5 whereby registering of the item "1" in register 1 is blocked. The divisor is then set-up in the multiplicand selecting mechanism by keys 3, with the highest order real digit, i.e., a digit other than "0", in the leftmost bank. In addition to making a selection of relative partial products, the depressed key in the leftmost bank also effects selection of quotient representations in the division mechanism relative to the value of that key.

Depression of either division key is normally prevented by key lock means which are rendered ineffective only when both the carriage is in its rightmost position and a real digit key 3 is depressed in the left-most bank. The key lock mechanism also includes, among others, means for holding a cycling key in operated position until the final phase of the operations instituted thereby are completed, and for preventing operation of a cycling key while another cycling key is in operated position, and while a factor key 3 is partially depressed. Operation of either key 12 or 13 excites a mechanism which conditions the machine (without upsetting current setups that may be incongruous with requirements for division) for subtractive entry of products and for sequential operations of the division, multiplying and shifting mechanisms, the latter to shift the carriage leftward. The conditioning mechanism also initiates the first cycle of operations of the division power unit. With the use of key 13, the conditioning mechanism also renders the tabulating mechanism effective to cause termination of the division process upon registration of a predetermined number of quotient digits. First, however, the tabulating mechanism must be set by depression of that tabulator key 11 which corresponds with the number of digits desired. With the use of key 12, whether or not selection of a tabulator key is made, or with the use of key 13 when a selection is not made, the tabulating mechanism will cause termination of the process only when the ordinal capacity of the machine is reached.

In algebraic division processes the problem is "solved" whenever the dividend is eliminated, i.e., reduced to "0." Sensing means, one for each order dial of register 2, are all movable together and movement is obstructed when a dial is displaced from "0" position, indicating a remainder. Accordingly, turning of all the dials to "0" position enables the sensing means to move, whereupon the sensing means effects termination of the division process automatically, there being no remainder and no reason for continuing the operations. Both the eliminated dividend sensing means and the tabulating device operate a mechanism which terminates the division process by preventing the sequential re-initiation of the division power unit after the instant final true quotient digit is registered.

Selection of a trial quotient value is made from representations of quotient values provided for dividend numbers ranging from 0 to 99 divided by divisor digits 1 to 9, both inclusive. The trial quotient first obtained may be an "over-estimation." In that case the mechanism automatically reduces the trial quotient by "1" and makes one or more further attempts to obtain the true quotient. When the true quotient, a single digit, is so obtained, it is registered in register 1. Failures to obtain the true quotient are evidenced by an over-draft from the dividend, which is automatically cancelled out by adding back into register 2 the amount substracted therefrom, i.e., the product of the divisor multiplied by the trial quotient which proved too large. In a majority of instances the trial quotient proves to be the true quotient. The need for repeating more than once to obtain the true quotient integer is relatively infrequent. "Under-estimation," i.e., selection of a too small quotient integer is not possible, due to the positive stop arrangements provided.

The preferred method of carrying out a division process in this machine is as follows: The value of the dividend digits in the two highest inboard orders of register 2, FIG. 1a, the 20th and 19th in the initial cycle is sensed. In the initial cycle the value in the 20th order wheel is "0" and in the 19th wheel the value is that of the highest order digit of the dividend. In accordance with the sensed dividend value, the pertinent quotient value representation of the divisor selected element is set-up. Then, the setup representation is sensed and concurrently the multiplier controls in the computing mechanism are adjusted automatically for that trial quotient value. Next, operation of the multiplying power unit is instituted automatically, whereby the multiplying mechanism is operated to obtain the product of the divisor factor (the multiplicand) times the trial quotient digit (the multiplier), to subtract that product from the dividend, and to enter the trial quotient in the first inboard order of register 1, the 10th order in the initial phase of the division process.

When subtraction of the product does not result in an overdraft, as would be indicated on register 2, a cycle of operations of the carriage power unit is instituted for an ordinal shift of the carriage leftward one step. In the final phase of the shift cycle, operation of the division power unit is initiated again, this time automatically, except, however, when the carriage has been shifted to its leftmost position, or to a preselected ordinal position, or whenever the dividend has been eliminated, showing that a solution has been reached. In the event an overdraft occurs, the overdrafting amount and the too large quotient digit entries are withdrawn from the respective registers 1 and 2, during which time the dividing mechanism reduces the value of the over-estimated digit by "1" and adjusts the multiplier controls accordingly. Operation of the multiplying power unit is reinitiated automatically, this time for obtaining the product of the divisor factor times the reduced trial quotient value and reducing the dividend by that product. If the value of a set-up trial quotient or of a reduced trial quotient is "0," operation of the carriage power unit is instituted for shifting the carriage leftward one step without first having to excite the multiplying power unit and mechanisms.

Figure 2:
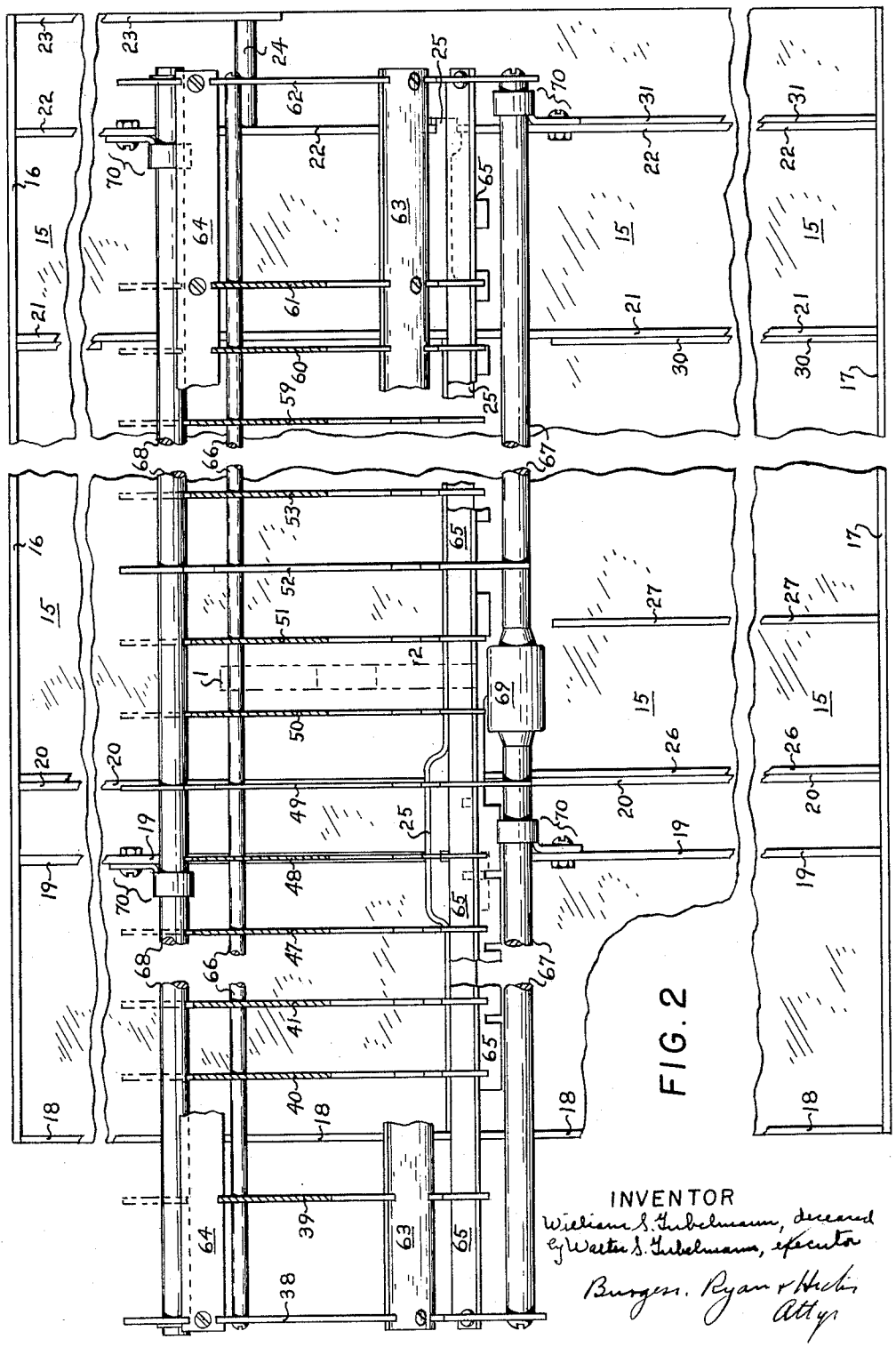
FIG. 2 is a plan view of the machine and carriage frames.
Figure 3:
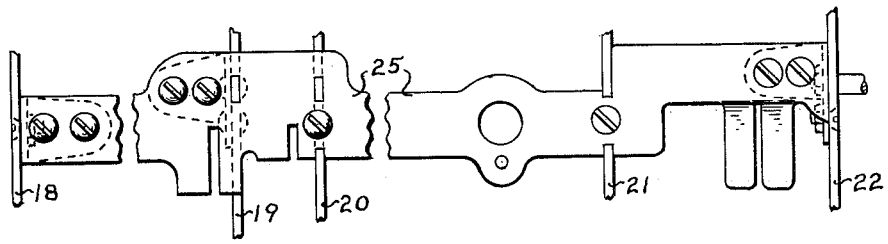
FIG. 3 is a condensed fragmentary view of a longitudinal frame member.

The frame of the machine embodying the invention includes base plate 15 (FIG. 2) to which rear and front plates 16 and 17 are fastened respectively, and plates 18–22 which extend parallelly between the front and rear plates and are secured thereto and to base 15. The rightmost plate 23 is a short plate which is secured to the rear and base plates and has its upper forward end secured to plate 22 by means of rod 24. A cross member 25 (FIG. 3) is secured to the upper faces of plates 18–22, inclusive, for making the frame structure more rigid.

Companion plates 26–31 (FIG. 2) are secured to each other parallelly, as by shaft sections (not illustrated), the ends of which are threaded for securing one section to the other and clamping the respective plate therebetween. The unit thus formed may be fastened removably to plates 20 and 22, as by bolts which are not shown. This unit supports mechanisms operated by various keys. Another frame unit which supports the keys and the locking mechanisms therefor is formed of the following plates: Top 32, FIG. 4, bottom 33, front 34, rear 35, and suitable side plates 36 and 37 which are not shown. This keyboard unit may be removably secured to companion plates 26–31 (FIG. 2) in any well known manner.

In the exemplary embodiment, the carriage is formed of 25 vertical frame plates 38 to 62 which are spaced and are secured to longitudinal frame members 63 and 64 and to feed bar 65. Further rigidity is added to the frame by rods 66, 67 and 68 which are secured to several of the plates, including end plates 38 and 62. Generally, the vertical plates form ordinal compartments for supporting 21 orders of register 2, and 10 orders of register 1. In addition to the register mechanisms, including a dial and several gears in each order, the carriage also carries components of an add-subtract control for carry operations in register 2, components of clearing and main carry mechanisms, and the carry mechanism for those orders of register 2 that may be outboard i.e., not engageable by the entry and carry mechanism of the main body. Rod 67 has secured thereto a compressible cylinder 69 which serves to actuate the tabulating mechanism at a preselected ordinal position and at each end position. Rods 67 and 68 art primarily utilized as rails by which the carriage is shiftably supported on four anti-frictional means 70 of which one pair is supported on frame member 22 and the other pair on frame member 19. Each means 70 comprises a roller 71 (FIG. 4) rotatably mounted on a bracket 72 which is secured to the frame member. The rails rest on the rollers, and the brackets encircle the respective rails so as to prevent random removal of the carriage.

2. Carriage Shifting Mechanism

Figure 7:
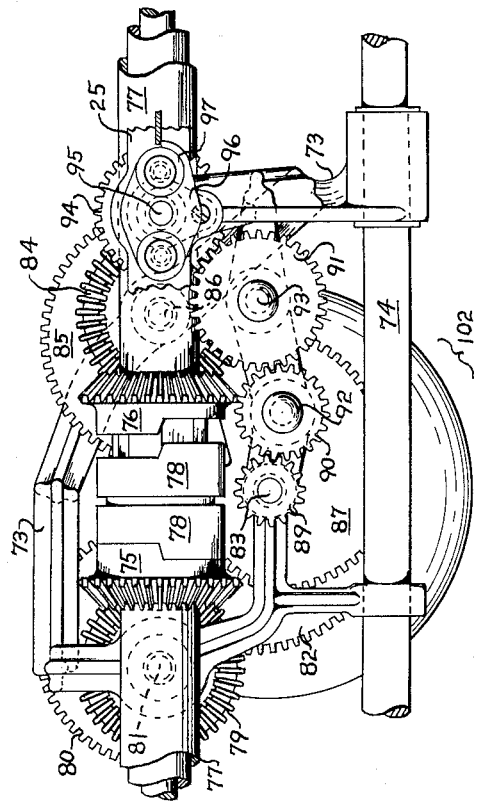
FIG. 7 is a front elevation illustrating the carriage shift mechanism and a part of the carriage power unit with which the mechanism is normally coupled for leftward shift operation.

Referring to FIG. 7, the carriage shifting or traversing mechanism is supported on frame member 73, preferably a casting, which is mounted at its rearward end on rod 74 and at its forward end on bar 25. Both the rod and bar are fixed to main frame members which are not shown here.

Beveled left traverse drive gear 75 and beveled right traverse drive gear 76 are rotatably mounted on sleeve 77 of the carriage power unit which will be described more fully later. At present, it will be understood that member 78, interposed between the bevel gears, is rotated by the power unit and is shiftable by manual and automatic means to engage one drive gear or the other. Normally, member 78 is coupled with gear 75. For each 360-degree revolution of member 78, the carriage is shifted one ordinal step, as will be described presently, either leftward or rightward, depending on the drive gear with which the member is coupled.

It will be noted that each end of member 78 has a single-step face and that the adjacent faces of the bevel gears are formed to receive the respective ends of the member for positive drive coupling therewith. A change-direction shift of member 78 is possible only when the stepped faces of the bevel gears are in mutual alignment. During a change shift operation, member 78 is in partial coupled relation with one gear before it is fully uncoupled from the other gear. In other words, the change shift member 78 operates to transfer its coupled relation from one to the other of the two gears 75, 76 without losing the correspondence between the angular position of the member and the ordinal position of the carriage.

Figure 6:
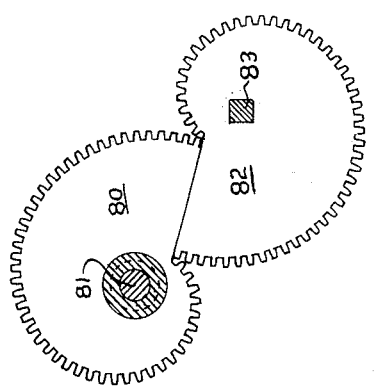
FIG. 6 is an illustration of one of two similar pairs of scroll gears of the carriage shift mechanism.

Gear 75 is meshed with bevel gear 79 which is fixed to scroll gear 80 rotatably mounted on stud 81 on frame 73. Scroll gear 80 (FIG. 6) is meshed with a corresponding scroll gear 82 which is fixed to square shaft 83 journaled on frame 73, FIG. 7. Bevel gear 76 is meshed with bevel gear 84 which is secured to a scroll gear 85 rotatably mounted on stud 86 on frame 73. Scroll gear 85 is meshed with a corresponding scroll gear 87 which is also secured on shaft 83. When gear 75 is coupled and rotated by member 78, shaft 83 rotates clockwise, but when gear 76 is coupled and rotated by member 78, shaft 83 rotates counter-clockwise. Consequently, during a shift operation, the drive gear 75, 76 which is not coupled with member 78 rotates in the reverse direction from that in which it rotates when it is coupled.

Thus it will be noted that during a single revolution of member 78, that is, at the stop-start position and at the 180-degree angle therefrom, the stepped clutch faces of gears 75 and 76 are is mutual alignment. At no other intermediate points of rotation is it possible to initiate a reversal of carriage movement. The stop-start position is always effective, and a mid-cycle reversal is impossible when carriage shifting is done automatically. The stop-start means, as will be described, is always effective in response to manual key initiation. It is fair to state, however, that, as a remote possibility, clutching of left drive gear 75 with member 78 at midpoint of a right shift cycle could take place with random timing of a manual release of the carriage right shift key 88, FIG. 1 (and such release of no other key), but no harm would result because, during the completion of the current cycle, automatic reversal of the traversing mechanism would immediately return the carriage to one of its proper ordinal positions. As will be described, member 78 (FIG. 7) is coupled with gear 76 by means which is spring urged for returning to normal position for coupling 78 with gear 75 when the initiating mechanism, or key, returns to normal position. Thus with random timing of a manual release of key 88, FIG. 1, a mid-cycle reversal could take place.

The unlikely, but temporary, arrest of the carriage at a mid-point of its normal stepping will, therefore, be understood to be automatically corrected during the second half revolution of the carriage power unit, since the latter can be stopped only when it completes a 360-degree revolution at which point the carriage always stands at an ordinal position.

Gear 89 is fixed to the forward end of shaft 83. Meshed gears 90 and 91, rotatable respectively on studs 92 and 93 on frame 73, entrain gear 89 with gear 94 which is fixed to shaft 95, journaled on frame 73. The ratios of the gear trains are such that for each 360-degree revolution of either gear 75 or 76, shaft 95 will rotate 180 degrees for shifting the carriage one ordinal step leftward or rightward respectively.

Figure 5:
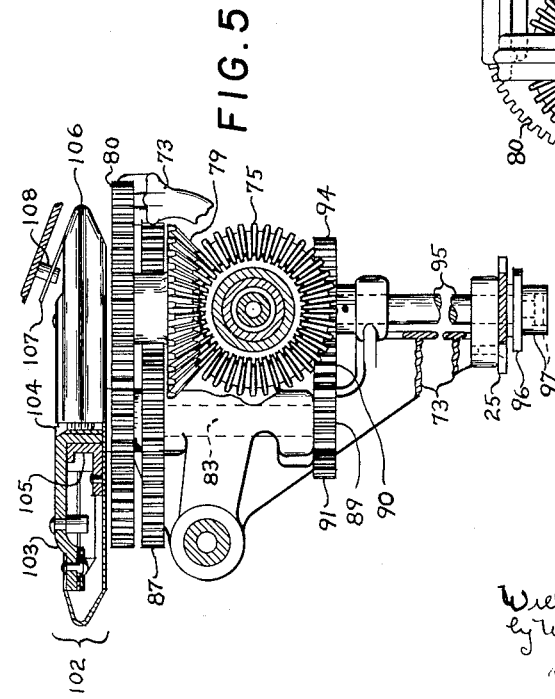
FIG. 5 is a fragmentary left side view of the carriage shift mechanism and of the governor for controlling the rate of operation of the mechanism and carriage power unit.

A lever 96 (see also FIG. 5) is secured to the forward end of shaft 95. Each arm of the lever has mounted thereon a roller 97. These rollers are received in ordinally disposed slots 98 (FIG. 8) on feed bar 65 which, as described, is secured to the carriage frame. The arrangement is such that as shaft 95 rotates 180 degrees, one of the rollers 97 will shift the bar one ordinal step and the companion roller will enter the next consecutive slot. When the carriage stands at its leftmost position, one of the rollers is seated in recess 99 which prevents clockwise rotation of member 96. Hence the right traverse mechanism is inoperable and the carriage power unit will not operate in response to initiation for shifting the carriage further rightward. A shift beyond the leftmost position is also prevented in a similar manner. With the carriage in the leftmost position, stepped projection 100 on lever 96 is in contact with plate 101 which is fixed to bar 65. The plate prevents the lever from rotating counterclockwise, whereby operation of the left traversing mechanism and the carriage power unit for shifting the carriage further leftward is prevented.

Referring again to FIG. 7, the meshed scroll gears of each train is a change ratio drive means. At the start of each cycle for shifting the carriage from one position to the next, a low drive ratio is provided by the scroll gears which in turning change progressively to provide higher drive ratios until the cycle is completed. Thus, greater power is obtained at the start of each ordinal shift and thereafter higher speeds are attained with corresponding reduction in power until the ordinal shift is completed. Further drive-ratio and speed-change advantages are obtained from the construction and arrangement of lever 96 and bar 25. In the initial and final phase of its swing, lever 96 effects lesser transverse movement of bar 25 than at midway of its swing. Hence, the lever 96 has more power for starting and stopping movement of the carriage, with smooth rapid acceleration and deceleration respectively.

The carriage may be shifted a plurality of steps uninterruptedly. Under such circumstances the traversing mechanism and the carriage power units may tend to rotate at accelerated speeds. A centrifugally responsive governor means 102 (FIG. 5) is provided for preventing the power unit and the mechanisms actuated thereby from operating at speeds above a certain magnitude.

Intermediate its ends, lever 103 is mounted on the square, rearward end of shaft 83 and is secured thereto, as by screw 104. The lever is formed with a hub on which flanged journal 105 is mounted. Brake casing 106 is secured to the flange of journal 105, and rotation of the casing is prevented by integral bifurcated extensions 107 which embrace stud 108 on the machine frame. Thus, the casing is supported on shaft 83 without hindering its rotation. Referring to FIG. 9, a pair of carriers 109 are pivoted at 110 at each end of lever 103. A suitably tensioned spring 111 is fastened to each carrier of a pair and to the corresponding carrier of the other pair for rotating the respective carriers inwardly, toward the axis of rotation of the lever 103. The inward movement of each carrier is limited by an integral finger 112 contacting a stud 113 on lever 103. A V-shaped brake-shoe mass 114 is rockably mounted on the free end of each carrier. Brake casing 106, the internal periphery of which conforms to the shape of the brake shoes, envelops the shoes. In the normal, as rest, position of the parts, as shown, the shoes 114 are not in contact with the internal clutching surface of the casing, but, when the speed of rotation of lever 103 (irrespective of the direction of rotation) reaches a certain magnitude, the shoe-masses respond to centrifugal forces sufficiently to overcome the restraint of springs 111, swing outwardly about the respective pivots of the carriers and press against the casing 106, thereby to retard acceleration whenever the traversing mechanism and carriage tend to operate at speeds above a certain magnitude.

3. *Carriage Power Unit and Arresting Means*

Carriage power unit 115 (FIG. 10) comprises sleeve 77 with cams 116, 117 and 118, stop-start means 119 and gear 120 secured thereto, and with beveled left traverse drive gear 75 and beveled right traverse drive gear 76 rotatably mounted thereon. Change-direction member 78 is mounted on splines 121 of the sleeve for rotation therewith and is slidable thereon for coupling with either one or the other of gears 75, 76. Sleeve 77 is rotatably supported by sleeve 122 which is rotatably mounted on shaft 123, journaled at its ends on the main frame.

As disclosed in the parent case, shaft 123 is responsive to the continual rotative drive forces of a motor represented by 124. A differential represented by 125 is secured to shaft 123 for operating the afore mentioned division power unit 126 and another differential which is represented by 127. This latter differential operates the multiplying power unit 128 and the carriage power unit 115, the latter through its gear 120. Each power unit is provided with a stop start means which is responsive to manually and automatically operated controls. The arrangement is such that the constantly urged shaft 123 tends to continually rotate the three power units. Such rotations of the shaft and units are normally prevented when the power units are stopped, each by their respective stop-start means. Upon initiatory operation of a stop-start means, the respective power unit and shaft 123 are free to rotate. During operation of one power unit, the other power units may also be liberated (only automatically) so as to rotate concurrently with the first liberated unit as, for example, when a carriage shift is initiated during the latter phase of a multiplying cycle of operation.

Carriage power unit 115 is urged to rotate counter-clockwise, as when viewing its stop-start means 119 in FIG. 11. Normally, rotation of the unit is prevented by its stop-start means being held by lever 129 which is secured to shaft 130 journaled on the machine frame. 119 comprises members 131 and 132. Member 131 is splined to sleeve 77 for rotation therewith and is formed with a pair of diametrical ears 133. The adjacent rockable member 132 is mounted coaxially with 131 and is provided with a pair of lost motion slots 134 and a pair of diametrically situated elongated openings 135 to correspond with the ears 133. Studs 136 on member 131 extend through the slots 134 to limit angular movement of parts 131, 132 with respect to each other. The studs are also formed so as to prevent lateral displacement of the disc. One end of each opening 135 is adjacent an ear 133 of member 131, and the configuration at the opposite end of each opening forms an ear 137. A recoil compression spring 138 is inserted in each opening and is fastened to the oppositely situated ears 133, 137. Springs 138 constantly tend to rotate disc 132 and member 131 oppositely of each other to normal position, as limited by studs 136 contacting the faces about the clockwise ends of slots 134. In order to start a shift operation, it is required only to swing lever 129 clockwise sufficiently to disengage its lateral lug 139 from nib 140 which the lug normally overlies. To stop the shift operation at an ordinal position of the carriage, it is required only to return lever 129 counterclockwise so that its lug rides the periphery of disc 132 to intercept the nib 140. When disc 132 is stopped, member 131 may continue its counter-clockwise turning to the limit allowed by its lost motion connection with the disc. At such times springs 138 are compressed, their resistance serving to cushion the stopping of the constantly urged power unit. The distorted springs then return to their original shape to position the power unit at its stop-start position.

Figure 12:
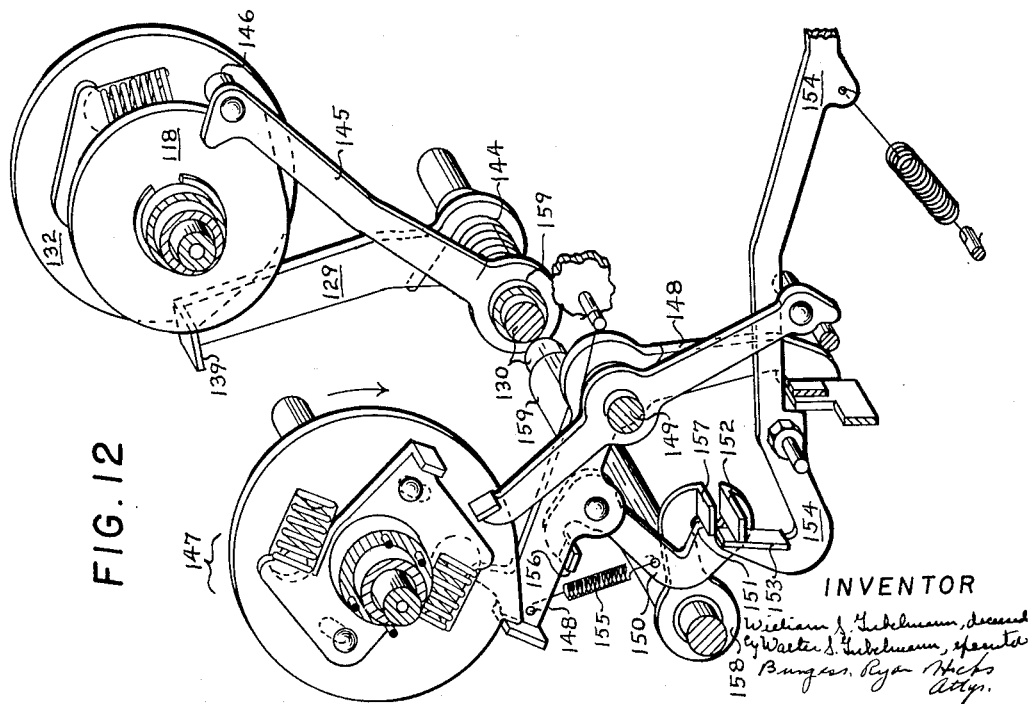
FIG. 12 is a fragmentary perspective view principally of the division power unit stop-start means and of controls operable on the stop-start means for effecting operation of the division power unit, including the control responsive to a division key and another control operable by the carriage power unit.

Three levers, 141, 142 and 143, are secured to journaled shaft 130 for effecting initiation of shift operations. Lever 143 is operated by automatic means and levers 141 and 142 are operated by manual means, as will be described. Immediately upon release of the operated one of the three levers, the unit formed of the levers, shaft and arrester lever 129, is returned to normal or arresting position of its lever 129 (FIG. 12) by torsion spring 144, fastened to 129 and to follower 145 which is pivotally mounted on shaft 130. Spring 144 constantly tends to rotate lever 129 clockwise to its arresting position with integral lug 139 against the periphery of disc 132 and to rotate follower 145 counter-clockwise so that roller 146 mounted thereon rides the periphery of cam 118 of the carriage power unit. In the final phase of each ordinal shift operation, cam 118 rocks follower 145 clockwise. During division cycling of the machine, such actuation of the follower is effective for initiating operation of the division power unit. As previously pointed out, a division computation normally consists of operation of the division power unit to obtain a trial quotient digit, operation of the multiplying power unit to obtain the product of the trial quotient digit times the divisor and subtract the product from the dividend, operation of the carriage power unit to shift the carriage one ordinal step, and operation of the division power unit again for obtaining the next quotient digit.

The stop-start means 147 of the division power unit and its arrester lever 148 which is pivoted on shaft 149 secured on the machine frame are similar to the corresponding parts of the carriage traversing mechanism. Rocking lever 148 counter-clockwise initiates operation of the division power unit. A depending hook 150 is pivoted on lever 148. This hook is formed with a stepped surface 151 and with a lateral lug 152, the latter standing in the path of vertical lug 153 formed on the rearward end of member 154. Lug 153 is of sufficient vertical length to stand in engaging relation with the lug 152 at all times. Spring 155, fastened to the hook and to lever 148, serves to rotate the hook clockwise and hold it in normal position, as limited by its lateral tab 156 contacting the under face of the lever. Whenever the machine is cycled for division, member 154 is stroked forwardly to, among other operations, rock hook 150 counter-clockwise so that step 151 is situated under lug 157 on the forward end of lever 158 which is pivoted on shaft 130. Lever 158 and follower 145 are secured to the ends of sleeve 159 on the shaft. Hence, when follower 145 is rocked clockwise, lever 158 pulls hook 150 downwardly to rock lever 148 counter-clockwise, thereby to initiate operation of the division power unit.

4. Shift Initiating Controls

Several manually operable means for initiating shift operations include the following keys: "0" multiplier 4, FIG. 1, carriage return 10, extreme left 160, left 161 and right 88 (each operable for a shift of 1 or more orders as desired) and extreme right 14.

The shank of "0" multiplier key 4 (FIG. 4) overlies lateral extension 162 of bellcrank 163 pivotally mounted on the machine frame. A link 164 is connected to the depending arm of bellcrank 163. Depression of the key rocks the bellcrank clockwise to stroke the link forwardly. Rearward in the machine, link 164 is pivotally connected to a pendent, reciprocatable link 165 of the non-shift key mechanism. Spring 166, fastened to the link 165 and biased to stud 167 on the machine frame, serves to hold the connected links 164 and 165 in normal position, downward and rearward, as shown. Further rearward, the end of link 164 is formed with a notch to normally embrace stud 168 on member 169 for rocking the member clockwise. Member 169 is fulcrumed on shaft 130. Since, as will be described presently, clockwise actuation of member 169 serves to initiate operation of the carriage unit, it is now obvious that disengagement of link 164 from stud 168 would render the forward stroke of the link ineffective for initiating a shift operation. Accordingly, link 164 is elevated by link 165 in response to operation of the non-shift key, as will be described, thereby to disengage link 164 from stud 168.

Bellcrank 170, fulcrumed on stud 168, is formed with a depending arm 171, an upright arm 172 and a rearwardly extending arm 173 which underlies stud 174 on the afore mentioned lever 142. The free end of arm 173 is formed with a hook in the path of which stud 174 stands with respect to forward stroking of the bellcrank. Thus, when member 169 is rocked clockwise, lever 142 is also swung clockwise sufficiently to effect initiation of a shift operation. Spring 175, fastened to the arm 171 and the machine frame, urges the bellcrank 170 counter-clockwise to normal position where its arm 171 is against stud 176 on the machine frame. At times when member 169 is swung clockwise and the arm 171 moves away from the stud 176, or when link 164 is disengaged from stud 168, counterclockwise turning of the bellcrank is prevented by its arm 173 which is in contact with stud 174.

It is desirable and customary to limit the shift operation initiated by a "0" multiplier key to a single step shift of the carriage even though the key may be held inadvertently in operated position indefinitely. Accordingly, means is provided to automatically disengage arm 173 from from stud 174 in time to permit the unit formed with lever 142 (FIG. 11) to return counter-clockwise to normal position for arresting the carriage power unit, as described, at the completion of a 360-degree revolution. Referring to FIG. 4 again, it will be noted that lost motion is provided between stud 174 and the hook formation on arm 173. During the time that the hook moves forwardly to engage the stud, the just mentioned automatic disengaging means is rendered operable. Follower arm 177, lateral member 178 and depending finger 179 are integral, and form a bail which is pivotally mounted on shaft 130. The bail is urged counter-clockwise by torsion spring 180 fastened to 178 and to the machine frame. In normal position of the bail, roller 181 on the free end of arm 177 is out of the path of cam 116 of the carriage power unit and bail finger 179 is in contact with lateral lug 182 on bellcrank arm 172, but without rotating the spring restrained bellcrank clockwise. In its forward stroke, bellcrank 170 rotates the bail clockwise so as to move roller 181 against the minor radius periphery of cam 116 at about the time lever 142 is rocked clockwise sufficiently to effect initiation of a shift operation. Then, early in the counterclockwise revolution of cam 116, its major radius periphery rocks the bail counter-clockwise to rock bellcrank 170 clockwise sufficiently to disengage its arm 173 from stud 174. The spring tensioned unit formed with lever 142 then returns to its arresting position to stop the carriage power unit at the completion of an ordinal shift of the carriage.

Shift keys 10, 160 and 14 (FIG. 11) are locked in operated position by suitable latching means until the final phase of the operations for the shift of the carriage to that ordinal position at which it is to stop. No means are provided for locking keys 161 and 88 in operated position. In addition to initiating a shift operation, each key 10, 88 and 161 renders the tabulating mechanism effective for stopping shift operations when the carriage reaches a preselected position between its current position and the extreme position toward which the shift is directed. Preselection is made by depressing the appropriate tabulator key, as will be described.

With carriage return key 10, the carriage is returned to the preselected position such as a start position in multiplication, as when accumulating products. If such a position is not preselected, the tabulating mechanism will automatically cause termination of the operations when the carriage shifts to extreme position. With left key 161 or right key 88, the shift operation will end at the completion of the cycle in which the operated key is returned. If, however, either of these keys is held in operated position indefinitely, the tabulating mechanism will terminate the shift operations when the carriage reaches a preselected position or, if preselection has not been made, when the carriage reaches the extreme position. Left and right extreme keys 160 and 14, respectively, do not render the tabulating mechanism effective for stopping the shift operation at a preselected position. At such times, however, the tabulating mechanism is automatically effective to terminate shift operations when the carriage reaches the respective extreme position.

In response to depression of any one of these shift keys, shaft 130 is rocked clockwise by means of lever 141 to initiate shift operations. The free end of the lever carries stud 183 which is normally engaged by a hook formed on the depending arm of bellcrank 184 so that elevation of the bellcrank will rock the lever clockwise. Bellcrank 184 is fulcrumed on the rearward end of lever 185 which is pivotally mounted on shaft 186 journaled on the machine frame. Spring 187, fastened to bellcrank 184 and to frame rod 24, tends to rotate the bellcrank clockwise and hold it in engagement with stud 183. A spring 188 is fastened to member 185 and to the machine frame for urging the member clockwise to its rest position. Member 185 carries a stud 189 which is normally latched by pawl 190 for elevating the member. Pawl 190 is pivoted on the free end of member 191 which is depended from journaled shaft 186 and is secured thereto. The pawl is held in engagement with stud 189 by spring 192 which is fastened to the pawl and to member 191. A forwardly extending lever 193, secured to shaft 186, is formed on its free end with lateral lug 194 which underlies the shank of carriage return key 10. The unit formed of 193, 186 and 191 is held in normal position with lug 194 against the key shank, by spring 195 fastened to member 191 and to a stud on the machine frame. Depression of the key rocks the unit counter-clockwise whereby pawl 190 is carried generally upwardly to elevate member 185. Pawl 190 is disengageable from member 185 in response to operation of the non-shift key, as will be described, whereupon the carriage return key is ineffective to initiate shift operations.

For elevation by the other shift keys, member 185 is provided with a lateral lug 196 which overlies the rearward arms of key operated levers 197 and 198, both of which are pivotally mounted on shaft 186. These levers also serve to support member 185 in its rest position. The forward arms of the levers extend under the shift key shanks so that keys 160 and 161 are operable only on lever 197 and that keys 14 and 88 are operable only on lever 198. When the lever 198 is rotated counter-clockwise, it also actuates means for engaging the carriage power unit with the right traversing mechanism, as will be described. Normally, the left traversing mechanism is coupled with the power unit.

Keys 88 and 161 may be released at will by the operator from depressed position. The parts operated by these keys are then returned by their respective springs, and arrester lever 129 will stop the carriage power unit at the completion of that revolution in which the lug 139 engages the periphery of 132. If member 185 is held in operated position by either key 88 or 161 until the carriage shifts to a preselected, or an end position, the tabulation mechanism will rock the bellcrank 184 counterclockwise, as by its lateral lug 199, to disengage the bellcrank from lever 141. This operation will occur in sufficient time to permit 129 to stop the carriage power unit at the completion of the revolution for the shift to that particular position. Upon return of member 185 to rest position, bellcrank 184 re-engages with stud 183. Random release of keys 10, 14, and 160 is not possible, and termination of the shift operation initiated by them is fully automatic. The tabulation mechanism disengages the bellcrank 184 from lever 141 and also releases the operated key when the carriage shifts to the end position, or when the carriage shifts to a preselected position and the operated key is 10.

As viewed in FIG. 13, lever 143 is rocked counter-clockwise to initiate shift operations. Such actuation of lever 143 is performed automatically by several controls. One control is operable upon disengagement of the entry and carry mechanism from the carriage borne register mechanisms after completion of each product entry and carry operations. Another control is operable when a "0" value quotient is obtained and still another control is provided for when the overdrafting trial quotient is "1."

Detent 200, pivotally mounted on stud 201 on the machine frame, serves to hold the entry and carry mechanisms, represented by 202, in engagement with the carriage borne register mechanisms. Early in a multiplying cycle of operations, 202 is elevated to effect engagement of the mechanisms. At such times torsion spring 203, fastened to detent 200 and to stud 204 on the machine frame, rocks the detent counter-clockwise to the position illustrated to hold 202 in engaged position. After the entry and carry operations are completed, the detent is rocked clockwise to disengage 202, except when an overdraft occurs during division. Link 205, connected to the detent, is reciprocated by means (not illustrated) normally operated by the multiplying power unit. If the value of the too large quotient is "1," the detent is rocked clockwise upon withdrawal of the quotient from the register therefor and the overdrafting amount is added to the dividend remainder. At such times 205 is not reciprocated. Instead, the detent is operated by lever 206 which is pivoted on stud 201. Depending arm 207 of the detent stands in the path of lug 208 on the lever, which has a link 209 connected to its upper arm. The link 209 is reciprocated by means (not illustrated) operated by the multiplying power unit after the dividend is restored. Normally the link 209 is not operable. Depending detent arm 207 has in its path (with respect to the clockwise stroke thereof) lateral lug 210 on lever 211 which is also mounted pivotally on stud 201. The depending end of lever 211 has pivoted thereon hook 212 which is normally latched on lateral lug 213 on the upper arm of bellcrank 214 fulcrumed on shaft 130. Spring 215, fastened to the hook and to the machine frame, urges the hook clockwise to its latching position and serves to hold lever 211 in normal position with integral finger 216 against stud 204. The depending arm of bellcrank 214 has pivoted thereon a member 217 which is urged clockwise against stud 218 on the bellcrank arm by torsion spring 219, fastened to the arm and the member. In normal position of member 217, integral finger 220 is in contact with lateral lug 221 on the lever 143 so as to rock the lever 143 counter-clockwise when bellcrank 214 is so moved by hook 212 in response to the clockwise actuation of lever 211 by the detent 200. After shift initiation is effected, detent 200 is returned counter-clockwise sufficiently to permit lever 211 to return to its normal position, whereupon bellcrank 214 is returned against stud 222 on the machine frame by spring 223 fastened to a stud on the frame and to a depending projection on member 224 (shown in part) which is pivotally mounted on the stud 218. Member 224 is reciprocated only when the trial quotient selected is "0" by means (not shown) operated by the dividing power unit. The return of bellcrank 214 to its normal position permits lever 143 and the unit formed therewith to be returned in time to effect arresting of the carriage power unit upon completion of a one step shift of the carriage.

Hook 212 overlies stud 225 on the upper arm of lever 226 which is pivotally mounted on the shaft 149. The depending arm of lever 226 is yieldingly connected to one end of a link 227 which may be moved rearwardly in the machine to effect disengagement of hook 212 from bellcrank 214 in response to operation of the add, subtract and non-shift keys, as will be described. In the latter instance, when division cycling is initiated, the aforementioned member 154 is pulled forwardly. Stud 228 is provided on the member for at such times to rock the lever 226 counterclockwise, thereby to re-engage hook 212 with bellcrank 214. The yieldable connection between lever 226 and the link 227 is such that the lever may be moved from operated position to its normal position without upsetting the non-shift key setting. Upon termination of division cycling, member 154 is returned rearwardly and spring 229, fastened to lever 226 and link 227, returns the lever to its operated position (assuming, of course, that in the meantime the non-shift key setting has not been altered by the operator).

In normal position of member 217, the rearwardly extending integral hook arm 230 stands over lateral lug 231 on the depending arm of lever 232 which is also fulcrumed on shaft 130. During division cycling of the machine, when the dividend is eliminated, or when the carriage shifts to a preselected or end position, member 217 is rocked counter-clockwise about its pivot so as to engage hook 230 with lug 231 and disengage arm 220 from lever 143. Thus, the shift operation is not initiated. Instead, lever 232 is operated to effect the return of the division conditioning mechanism and of the parts operated thereby. Since each successive operation of the division power unit, as previously described, is dependent on operation of the carriage power unit, preventing the initiation of a shift operation effectuates termination of division operations.

For rocking member 217 counter-clockwise about its pivot, hook 233 is latched on to stud 234 on member 217 and is pulled upwardly. Stud 228 on member 154 of the conditioning mechanism normally holds the hook 233 rearward of the stud 234. When the machine is conditioned for division, member 154 moves forwardly whereupon spring 235 fastened to the hook and to stud 236 on the machine frame, swings the hook counter-clockwise to engage it with stud 234. The upper end of hook 233 (FIG. 14) is pivotally connected to member 237 which is secured to one end of a sleeve 238 rotatable on shaft 239 fixed on the machine frame. The other end of the sleeve has a lever 240 secured thereto. A bellcrank 241, fulcrumed on a suitable bracket secured to the frame, has a transverse arm and an upright arm. The transverse arm overlies lateral lug 242 on lever 240, and the free end of the upright arm of the bellcrank stands in the path of disc 243 of the tabulating mechanism. When the carriage moves to a preselected or end position, the tabulating mechanism rocks the bellcrank 241 so as to swing lever 240 to a counter-clockwise position, whereby to pull hook 233 upwardly to effect termination of division cycling, as explained, after the quotient is determined and registered in that final order of the register therefor. Finger 244 of member 237 overlies lateral lug 245 on one arm of bellcrank 246 pivoted on shaft 239. The other arm of the bellcrank has a link 247 connected thereto for rocking the bellcrank counter-clockwise, thereby to elevate the hook 233. Link 247 is reciprocated by means (not shown) provided for sensing the elimination of a dividend. This operation occurs before the operation for initiating a shift is performed. Hence, spring tensioned detent 248, fulcrumed on stud 249 on the machine frame, is provided for latching bellcrank 246 in operated position until bellcrank 214 (FIG. 13) is swung counterclockwise, as described. Thus, in such instances too, return of the division conditioning mechanism is effected instead of a shift initiation, as set forth.

5. Tabulation

In the exemplary embodiment herein shown, provision is made for ten ordinal positions of the carriage, two end or extreme positions and eight intermediate positions. The tabulating mechanism automatically causes the stop-start means to arrest the carriage power unit whenever the carriage shifts to an end position, and the mechanism may also be selectively conditioned and rendered operable to cause stopping of the carriage at an ordinal position between the extremes.

Eight keys 11 (FIG. 1) are provided for conditioning the mechanism. Each key, reading from left to right, is designated by a numeral 2 to 9, which represents the ordinal position of the carriage for which the mechanism will be conditioned upon depression of that key. Even though the tabulating mechanism is in its conditioned state, it is normally inoperable until the same is rendered effective or operable by means operated automatically by the carriage power unit when cycling is initiated by carriage return key 10, right and left keys 88, 161, or divide tabulation key 13, as will be described presently.

Keys 11 (FIG. 22) are pivotally mounted on shaft 250 of the keyboard dials 251, which is journaled on frame members 26 and 31, FIG. 17. These keys are locked down automatically upon depression and are held in depressed position until released by depression of either of the two clearing keys 252, one situated at each end of the keys 11. Directly under each key 11 is a latch-pawl 253 (FIG. 22) formed of any suitable flexible material and secured to shaft 254 which is journaled on frames 26 and 30, FIG. 17. A member 255 is fixed to shaft 254 towards each end thereof. The free end of each member 255 underlies one of the clearing keys 252 (FIG. 21) so that upon depression of one of the keys, the unit formed of the parts 255, 254, and 253 (FIG. 22) will swing counterclockwise. The unit is urged clockwise by a pair of torsion springs 256, FIG. 21, each of which is fastened to a member 255 and to a member 257. The latter member is journaled on shaft 250 and is held stationary by its depending arm which is bifurcated to embrace fixed shaft 258 of the keyboard mechanism frame.

In normal position, each latch-pawl 253 (FIG. 22) is flexibly pressed against the rounded rearward face on hook 259 formed under the forward end of the related key 11, thereby to cam the key upwardly to normal position, against the overlying cover plate 260. When a key is depressed sufficiently, its flexed latch 253 snaps clockwise into the recess formation of hook 259, thereby to hold the key in depressed position. The latching action of one latch does not expend the flexure of the other latches. Hence, more than one key 11 may be depressed and locked to condition the tabulating mechanism for as many tabular positions of the carriage. Depression of either clearing key 252 (FIG. 21) rocks the aforedescribed unit of parts 255, 254 and 253 (FIG. 22) counter-clockwise to disengage latches 253 from hooks 259 of depressed keys, whereupon the keys are returned by their respective springs, as will be described presently.

Adjacent each key 11, an ordinal member 261 is fulcrumed on shaft 250. Stop initiating members 262, one for each ordinal member 261, are pivoted on shaft 263 which is journaled on frame members 26 and 31, FIG. 17. Each stop member 262 (FIG. 22) is formed with a recess on its forward end for receiving lateral extension 264 on the rear extremity of its related member 261 so that actuation of member 261 will rock stop member 262. U-shaped bail 265 is secured to shaft 250 toward the ends thereof, FIG. 17, and a generally depending lever 266 is also secured to the shaft at its right end. Torsion spring 267, fastened to frame member 31 and lever 266, urges the unit formed of 250, 265 and 266 (FIG. 23) clockwise to normal position with bail 265 (FIG. 20) contacting a suitable stop, such as lug 268 on frame 30. The bail stands in the path of generally upright arms 269 (FIG. 22) of members 261 with respect to clockwise movement of the members. Hence, in its normal position bail 265 holds members 261 against turning and at a counter-clockwise position at which the stop members 262 coupled therewith are held out of the path of compressible cylinder 69 carried by the carriage. In this state the tabulating mechanism is referred to as being inoperable.

A torsion spring 270 is situated between each member 261 and its related key arm and is fastened respectively to each to maintain the rearward extension of the key arm in contact with lateral lug 271 of the member. Depression of a key 11 increases the tension of its spring 270 which serves to return the key and/or to turn the associated member 261 clockwise when bail 265 is swung clockwise, as will be described. Such turning of member 261 rocks the coupled stop member 262 counter-clockwise into the path of cylinder 69 for axial actuation by the cylinder, also to be described. With a stop member 262 in the path of the cylinder, the tabulating mechanism is in its operable state.

Referring to FIG. 23, the forward end of link 272 is pivotally connected to the lever 266, and the other end of the link carries a stud 273 which is received in a cam slot 274 on depending lever 275. The lever 275 and a follower 276 which carries a roller 277, are secured to a sleeve 278 to form a unit rockable on shaft 130. Hook member 279, fulcrumed on stud 273, has a lateral lug 280 which overlies the link for limiting counter-clockwise rotation of the hook, whereby to form a unit of the hook and link rockable counter-clockwise about the link's pivot on lever 266. Tensioned spring 281, fastened to lever 275 and hook 279, tends to elevate the link-hook unit, but the unit is normally held in a depressed position as limited by the stud 273 in slot 274. In this position of the parts, stud 273 holds the lever 275 in a counterclockwise position so that the roller 277 stands free from contact with the major radius peripheral portion of cam 117 of the carriage power unit.

Depression of link 272 to normal position is accomplished by lever 282, the rearward end of which overlies lateral lug 283 of the link. Lever 282 is pivotally mounted on shaft 186 and its forward arm underlies the shanks of shift keys 88 and 161 for actuation thereby. A lateral lug 284 on the forward arm of the lever is embraced by a bifurcated arm of spring tensioned bellcrank 285 which is fulcrumed on shaft 286 of the keyboard mechanism frame. Spring 287 is fastened to the bellcrank and to a suitable stud on frame member 22 for rocking the bell crank counterclockwise, whereby lever 282 is swung clockwise to depress the link-hook unit to its normal position.

Lever 282 is rocked counter-clockwise in response to depression of shift keys 88 and 161, carriage return key 10 (FIG. 1) and divide tabulation key 13. Keys 88 and 161 (FIG. 23) are operable directly on the lever. For actuation by the carriage return key, the rearward arm of the lever is formed with a hook 288 which overlies stud 289 on pawl 190 so that elevation of the pawl will swing the lever counter-clockwise. Referring to FIG. 11, it will be recalled that pawl 190 is moved upwardly each time key 10 is depressed. Actuation of lever 282 (FIG. 23) may be performed by means such as lever 290 which is secured to shaft 291 journaled on the machine frame. The free end of lever 290 has a lateral lug 292 which overlies the generally depending arm of bell crank 285 so that counterclockwise actuation of the lever rocks the bellcrank clockwise, thereby to swing lever 282 counter-clockwise. Shaft 291 may be rocked counter-clockwise in response to depression of the divide tabulation key as disclosed in the parent application.

Counter-clockwise rotation of lever 282 permits spring 281 to elevate the link-hook unit. Stud 273 of the unit moving upwardly in cam slots 274 cooperates with the slot to rock the lever 275 clockwise sufficiently to effect engagement of roller 277 with the minor radius peripheral portion of cam 117. Then, in the initial phase of the first cycle of the carriage power unit, cam 117 rocks follower 276 (and the unit formed therewith) counter-clockwise to pull the link-hook unit rearwardly sufficiently to turn shaft 250 counter-clockwise for rendering the tabulating mechanism operable.

Stud 176 on frame 22 stands in the path of upturned formation 293 on the rearward end of hook 279. While the hook is moving upwardly, its upturn contacts the stud, causing the hook to rock clockwise. Consequently, when the hook-link unit is stroked rearwardly sufficiently to move 293 beyond stud 176, spring 281 will rock the hook counter-clockwise to latch it onto the stud. In latched position hook 279 holds the parts connected thereto in operated position until the division computation (initiated by the "divide tab" key) is terminated or, when the machine is cycled only for shift operations, until the shift initiating key is returned. When this occurs, lever 282 is returned to depress the link-hook unit. Consequently, hook 279 disengages from stud 176 and spring 267 turns lever 266 clockwise, thereby to return the link-hook unit forwardly to normal position and to render the tabulating mechanism inoperable again.

Referring to FIG. 17 again, a stop member 294 is provided for each extreme position of the carriage. These members, supported on shaft 263, are similar to members 262. The extreme members 294 receive the lateral lugs 295 (FIG. 21) of stationary members 257 to hold the members 294 in the path of cylinder 60. Stop members 262 (FIG. 17) and 294 are mounted on shaft 263 at spaced points corresponding to the ordinal positions of the carriage. The members may be mounted in any well known manner so as to prevent their lateral displacement on the shaft when actuated axially by cylinder 69. Instead, the shaft is journaled for lateral movement so as to respond to the actuation of a stop member by the cylinder. Such movements of the shaft are limited, as by split rings 296 mounted thereon in annular grooves. The rings butt against the faces of respective journals 297 secured on frames 26 and 31.

The relationship between cylinder 69, carried by the carriage, and the stop initiating members is such that when the carriage is at an ordinal position (assuming that the stop member of that position is not in the path of the cylinder), the cylinder overlies the stop member of that position and is generally midway between the adjacent stop members, and the respective faces of the cylinder are generally equidistant from those members. For example, assuming that the 4th ordinal stop member 262 is in the path of the cylinder and the carriage is traversing either leftward from the 3rd ordinal position or rightward from the 5th position, the respective left or right face of the cylinder engages the 4th ordinal stop member early in the current cycle and shifts the shaft 263 in the respective direction.

The ring-limited axial movement of shaft 263 is completed before the carriage completes its shift to the respective ordinal position. Accordingly, cylinder 69 is provided with yielding or lost motion means to permit the carriage to complete its shift. Referring to FIG. 18, two bearing members 298 are slidably mounted on rail shaft 67 between a pair of split rings 299 mounted in annular grooves on the shaft. An expansion spring 300 between the bearings urges the bearings axially against the rings. The cylindrical casing 69 is slidably supported by the bearings and it is rolled over on its ends sufficiently to embrace the bearings so as to prevent random sliding of the casing. If, for example, the carriage is moving leftward and the cylinder shifts the left extreme stop 294 (FIG. 19) leftward its limited extent, then casing 69 and the left bearing 298 are arrested by the stop, but the right bearing continues to move leftward with the carriage for the remainder of the shift and compresses the spring 300.

Whenever the carriage is at an extreme position, the cylinder remains in its compressed state until the carriage is moved in the opposite direction, away from non-rockable or fixed stop 294. Then spring 300 restores the cylinder to its normal state, FIG. 18. If compression of the cylinder is effected by a stop member 262, FIG. 22, the cylinder is restored to its normal state when the stop is swung out of the path of the cylinder by the return stroke of bail 265. The bail is returned at or about the end of the cycle in which termination of the shift occurs, as previously described. Moving the cylinder away from stop 294, or rocking the effective stop 262 out of the path of the cylinder allows shaft 263 to be returned axially to its normal position by means to be described presently. In its normal state and at an intermediate position, cylinder 69 overlies the stop member of that position. That stop cannot be swung into the path of the cylinder until the carriage has been shifted to an adjacent position. In the event that more than one stop 262 is swung into the path of cylinder 69, shift or division computation termination will occur when the carriage shifts to the position corresponding to the first obstructing stop. If a subsequent shift cycle is initiated by return key 10, FIG. 1, left key 161 or right key 88 (providing the shift is again in the same direction and that, if one of the latter two keys is used, it is held depressed indefinitely), cycling will terminate when the carriage shifts to the position corresponding to the next obstructing member 262, FIG. 17.

Disc 301, FIG. 25, secured to the right end of shaft 263, is embraced by a pair of vertical fingers 302 on rocker 303 which is fulcrumed on bracket 304 fixed to frame member 22. Rocker 303 is also formed with a pair of horizontal ears 305, one on each side of the rocker. A leftward shift of shaft 263 will swing rocker 303 counterclockwise and elevate right ear 305, and a rightward shift of the shaft will swing the rocker clockwise and elevate its left ear. A U-shaped member 306, FIG. 23, pivotally mounted on stud 307 on frame 22, has a pair of arms, each of which extends forwardly and overlies one of the ears 305. Elevation of either ear rocks member 306 clockwise.

Torsion spring 308, fastened to an arm of member 306 and frame 22, urges the member counter-clockwise thereby to return rocker 303 and shaft 263 to normal position. Member 306 has a generally depending arm on the free end of which a generally upright pawl 309 is fulcrumed. Stud 310 on the depending arm of 306 stands in the path of the pawl to limit its clockwise movement by torsion spring 311 which is fastened thereto and to member 306. Pawl 309 is formed as a hook on its upper end and has a depending finger 312. It will be recalled that lever 185, carrying bellcrank 184, is elevated in response to depression of any shift key to effect shift initiation. In elevated position, lug 199 on bellcrank 184 is in engaging relation with the hook of pawl 309. Then, when the pawl is rocked clockwise about stud 307 as its center, it engages the lug to rock the bellcrank 184 counter-clockwise to terminate the shift operation as previously described. In the final phase of its clockwise stroke, finger 312 contacts stud 313 which causes the pawl to rock counterclockwise about its pivot 314 to disengage it from lug 199. Stud 313 is fixed on frame member 22.

Link 315, the rear segment of which is shown connected to depending arm of 306, is reciprocated by the arm to cause the lock mechanism for the shift keys 10 (FIG. 1), 14 and 160 to release the depressed one of the keys, as disclosed in the parent case.

Referring to FIG. 17 again, a disc 243 is secured to the left end of shaft 263. This disc serves to operate means provided for effecting termination of division cycling, as previously described, when the shaft is shifted leftward (the only direction in which it is shifted) during division.

6. Shift Direction and Non-Shift Controls

Three selectively operable keys 8 (FIG. 1), 7 and 9 are provided, the first for ineffectuating certain shift initiating operations, and the other two for controlling the direction of shift, as for multiplying operations when the multiplier is to be set up reading from left to right or from right to left. Each key is slidably mounted on the keyboard frame and is provided with return spring 316, FIG. 26. The strokes of the keys are limited by bar 317 which passes through suitable slots on the key shanks and is removably fixed to the keyboard frame. A spring tensioned, pivotally mounted latch 318 is right adjacent to the key shanks which are so contoured that depression of a key effects oscillation of the latch, and that the latch holds the key in depressed position. If one key is locked in depressed position and another key is depressed, the oscillation of the latch permits the initially depressed key to be returned. Finger 319 of the latch extends upwardly through a suitable slot on plate 32 for manual oscillation of the latch in the event it is desired to have all the keys in the up position, or in the event all the keys are inadvertently in depressed position and a particular setup is desired. Normally, however, when one key is in depressed position the other two are in their up positions.

The shank of key 8 overlies lateral lug 320 on the forward arm of bellcrank 321 fulcrumed on shaft 186, and depression of the key rocks the bellcrank counterclockwise. The free end of the depending bellcrank arm is formed with camming faces 322 which cooperate with stud 289 on pawl 190 to rock the pawl 190 clockwise and hold it disengaged from stud 189 on lever 185, FIG. 11, when the non-shift key is depressed. It will be recalled that with the pawl 190 disengaged from stud 189, elevation of the pawl in response to depression of carriage return key 10 is not effective to initiate shift operation.

The rearward arm of bellcrank 321 (FIG. 26) has connected thereto a link 165, the depending end of which is connected to link 164. Counter-clockwise turning of the bellcrank elevates link 164 (FIG. 4) thereby to render ineffective the forward stroke of link 164 to institute shift operations in response to operation of the "0" multiplier key 4, as previously explained. It will also be recalled that spring 166 exerts a downward pull on link 165 thereby to return bellcrank 321 (FIG. 26) clockwise to the position illustrated, when key 8 is returned.

For ineffectuating automatic shift initiation by key 8, the depending arm of bellcrank 321 has the rearward end of link 323 connected thereto and the other end of the link is pivotally supported on lever 324 which is secured to shaft 325 journaled on the machine frame. Lever 324 carries stud 326 which is received normally in the forward end of lost motion slot 327 on link 323. In response to depression of key 8, link 323 is moved rearward to rock lever 324 and shaft 325 clockwise. Shaft 325 may be rocked clockwise as by either the add key or subtract key as will be described, but at such times link 323 is not stroked rearwardly. Stud 326 merely swings rearwardly in slot 327.

The shanks of add key 5 (FIG. 27) and subtract key 6 overlie lateral lug 328 on the forward arm of spring restrained bellcrank 329 which is pivotally mounted on fixed shaft 258. Depression of either key rocks the bellcrank 329 counter-clockwise whereby link 330, connected at one of its ends to the depending arm of the bellcrank, is moved rearwardly. Referring to FIG. 28, it will be seen that the forward end of link 330 is connected to lever 331 which is pivotally mounted on shaft 325. Lever 331 has in its clockwise path of movement lateral lug 332 of lever 333 which is secured to shaft 325. The rearward movement of link 330 will rock levers 331 and 333 and shaft 325 clockwise, but the clockwise swing of lever 333 as in response to the non-shift key will not move the link 330 rearwardly.

Shaft 325 has secured to its left end a lever 334, the upper end of which has connected thereto link 227. Clockwise actuation of shaft 325 moves link 227 rearwardly. Referring to FIG. 13, it will be recalled that such operation of link 227 disengages hook 212 from lever 214 thereby to ineffectuate the automatic shift initiating operation. When, however, the machine is cycled for division it is required that hook 212 be coupled with lever 214 even though the non-shift key is depressed. The yieldably restrained connection between member 226 and link 227 allows the member to be rocked counter-clockwise to effect re-engagement of hook 212 with lever 214, as described, without affecting the non-shift setup. After the division computation is completed, member 226 moves back to its clockwise position to disengage the hook, and the non-shift setup is again effective. The unit formed of shaft 325 (FIG. 28) and levers 334, 333 and 324 is returned counter-clockwise by torsion spring 335, fastened to lever 334 and to frame member 20, as limited by bellcrank 321 (FIG. 26) contacting the shank of key 8.

With reference now to setting the direction of shift. A lateral link 336 (FIG. 15) is formed with a forward extension 337 (FIG. 16) which is bifurcated to embrace slidable change-shift member 78 in an annular groove 338 thereon. Hence, rightward movement of the link shifts member 78 to clutch right traverse drive gear 76 (FIG. 7) and the return or leftward movement of the link shifts the member back to clutch left traverse gear 75, as shown. The left end of link 336 (FIG. 15) is pivotally connected to depending lever 339 and the right end carries a stud 340 which is received in lost motion slot 341 on the depending arm of bellcrank 342. Lever 339 and bellcrank 342 are pivotally mounted on a plate 343 which, inset a suitable opening on frame member 16, is secured to the rear ends of plates 21 and 22. Spring 344, fastened to lever 339 and to the depending arm of bellcrank 342, urges the lever counter-clockwise and the bell crank clockwise to normally hold stud 340 of the link in contact with the bellcrank at the right end of the slot 341. Thus, when bellcrank 342 is rocked counter-clockwise, as will be described, link 336 will move rightward to effect coupling for a shift of the carriage in that direction. Bellcrank 342 is rocked more than enough to effect such coupling, but the over rotation is taken up in the lost motion slot 341. The slot also allows rocking of the bellcrank at times when the stepped faces of drive gears 75 and 76 (FIG. 7) are not in mutual alignment and member 78 is not shiftable, as previously explained. A spring 345 (FIG. 15) of lesser tension than spring 344 is fastened to lever 339 and to plate 343 so as to urge the lever clockwise for normally holding the bellcrank in its clockwise position and the link in its leftward position as limited by the left traverse drive gear clutching position of member 78, FIG. 7. The other arm of bellcrank 342 (FIG. 15) extends rightwardly and carries on its free end a lug 346 by which the bellcrank is rocked counter-clockwise. As viewed in FIGS. 29, 30 and 31, such movement of bellcrank 342 will be referred to as being "upward."

Referring to FIG. 11, it will be recalled that lever 198 is rocked counter-clockwise by either of the right shift keys 14 or 88. Lug 346 (FIG. 30) on bellcrank 342 overlies the rearward end of lever 198 so that whenever a right shift key is depressed, the bellcrank is always moved upwardly.

In FIG. 29, a rearwardly extending lever 347 is pivoted on shaft 348 which is fixed on the machine frame. The lever carries a roller 349 which overlies the periphery of cam 350 of the multiplying power unit and on its free end under the lug 346, the lever has an upwardly extending member 351 fulcrumed thereon. One end of a link 352 is pivotally connected to member 351 and the other end has a lost motion slot 353 for receiving stud 354 on the depending arm of bellcrank 355 which is fulcrumed on shaft 186. Another arm of the bellcrank extends forwardly where integral lug 356 underlies the shank of right direction key 9. Torsion spring 357, fastened to bellcrank 355 and the machine frame (not illustrated), urges the bellcrank clockwise against the key shank. A spring 358 of lesser tension than spring 357 is fastened to the generally depending end of member 351 so as to hold roller 349 in contact with cam 350 and to urge the member clockwise as limited by the slot and stud connection of link 352 with bellcrank 355. The arrangement is such that when key 9 is in its up position, member 351 is canted forwardly of lug 346 on bellcrank 342, as illustrated, but that when the key is depressed, bellcrank 355 is rocked counter-clockwise thereby to permit spring 358 to rock member 351 clockwise to a generally vertical position under the lug 346. Then, and only then, elevation of lever 347 will also raise the bellcrank 342. Cam 350 is so contoured that in each 360-degree clockwise revolution it will elevate the lever sufficiently to effect a rightward shift coupling before the automatic shift initiation operation occurs, and will permit the lever to return to its normal position at about the time the carriage has passed the midpoint of its ordinal shift.

Figure 4:
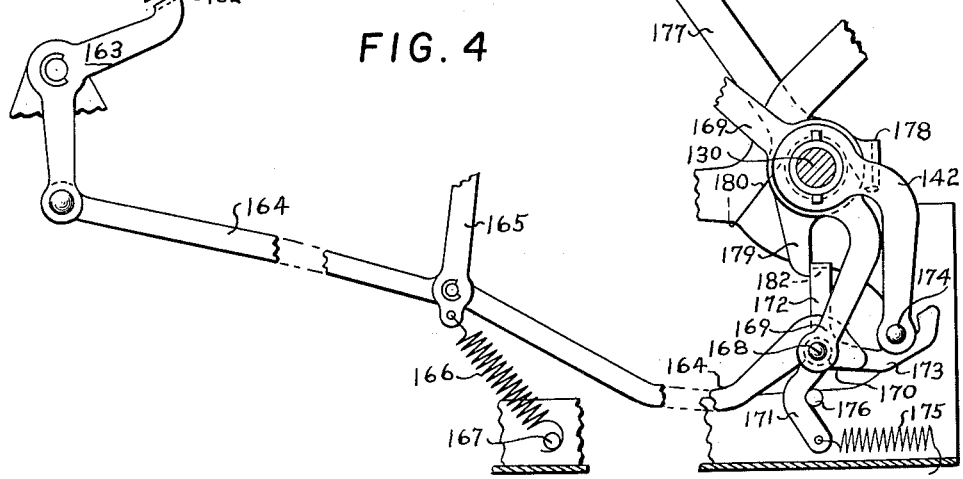
FIG. 4 is a condensed fragmentary side elevation of the single step carriage shift control for the carriage power unit stop-start means, the "0" multiplier key and the means operable thereby for triggering the stop-start means and rendering the control effective.

Lever 347 is also elevated in response to depression of the "0" multiplier key which, as will be recalled, is in effect a shift initiating key. This is accomplished by a generally depending lever 359 which is pivotally mounted on shaft 348. The free end of lever 359 is bifurcated to receive stud 360 on the upper arm of member 169, and the lever has a lateral lug 361 which underlies lever 347. Clockwise movement of member 169 rocks lever 359 counter-clockwise to elevate lever 347. Referring to FIG. 4, it will be recalled that member 169 is rocked clockwise in response to depression of "0" multiplier key 4, except, of course, when the non-shift key is depressed.

From the foregoing it will be understood that with key 9 (FIG. 29) in its up position, the ordinal shift of the carriage for multiplying will be leftward and that with the key in depressed position, the ordinal shift will be rightward. When the machine is cycled for division, the carriage must shift leftward even though key 9 is in depressed position. The rearward movement of link 352 in response to depression of key 9 carries stud 362 on the link into the path of finger 363 on slide 364 with respect to forward movement of the slide which is slidably mounted at its rearward end on stud 365 on the machine frame and which is pivotally connected at its forward end on lever 366, fulcrumed on shaft 348. Link 367 which is also connected to lever 366, is part of suitable linkages for connecting the lever with conditioning means responsive to depression of a division key. Lever 366 is rocked counter-clockwise by link 367 only when a division key is depressed. Thus, slide 364 is moved forwardly sufficiently to effect recanting of pawl 351, thereby to prevent rightward shifting of the carriage during division operations. At such times key 9 remains in depressed position, the forward movement of link 352 being taken up in slot 353. Slide 364 is returned automatically to its normal position, as illustrated, when the division computation is completed. Hence, pawl 351 returns to its generally upright position.

Normally, when key 9 is depressed, key 7 (FIG. 31) is in its up position, and when key 7 is depressed, key 9 (FIG. 29) is in its up position. Key 7 (FIG. 31) controls the direction of the shift initiated by the carriage return key so that the carriage will shift in the direction opposite to that in which it shifts during multiplication in response to automatic and "0" multiplier key initiation. This is accomplished by the following means: The shank of key 7 overlies lateral lug 368 on bellcrank 369 which is fulcrumed on shaft 186 and is urged clockwise against the key shank by torsion spring 370 fastened to the bellcrank and the machine frame. Stud 371 on the depending arm of the bellcrank slidably supports the forward end of link 372 in slot 373. The rearward end of the link is pivotally connected to a pawl 374 which is fulcrumed on the free end of the rearward arm of bellcrank 375. A torsion spring 376 of lesser tension than spring 370 is fastened to pawl 374 and bellcrank 375 for rocking the pawl clockwise to a generally vertical position beneath the lug 346 when bellcrank 369 is rocked counter-clockwise by key 7. Pawl 374 is canted forwardly of lug 346, as illustrated, when key 7 is in its up position. At such times bellcrank 342 is not raised when bellcrank 375 is rocked counter-clockwise about its fulcrum, shaft 348, but with pawl 374 in its vertical position, bellcrank 342 will also be elevated to effect rightward shift coupling. Bellcrank 375 is rocked counter-clockwise each time the carriage return key is depressed. The depending arm of the bellcrank is connected as by a link 377 to the depending member 191 which, upon referring to FIG. 11 it will be recalled, is rocked counter-clockwise by return key 10.

Since keys 9 (FIG. 29) and 7 (FIG. 31) may be operated at the option of the operator, means are provided for preventing pawls 374 and 351 (FIG. 29) from rocking from canted to vertical position, or vice versa, while the pawls are in elevated position. A bellcrank member 378, mounted on stud 365, may be prevented from rocking clockwise as by having its upright arm held yieldably in contact with stud 379 by suitably anchored spring 379a. Another arm of the member extends forwardly and is formed with a lateral lug 380 which extends over both link 352 and link 372, FIG. 31. Each link is formed with an upright finger 381 which terminates slightly below lug 380 when the link is in its normal down position. Fingers 381 situate immediately forward and rearward of lug 380 when the pawls are respectively in their canted and vertical positions. In elevated position of the links the lug 380 stands in the path of the fingers 381 thereby to prevent the links from shifting in the direction opposite to that in which they currently stand. If, for example, one of the links is in its rearward position and the depressed key is returned to its up position, lug 380 will hold the link (and, of course, the related bellcrank 355 or 369) in operated position until the link is lowered again. If a link is in its forward position and its related key is depressed, lug 380 holds the link while the bellcrank moves freely in the lost motion slot of the link, and after the spring tensioned link is lowered it is free to move to its rearward position. It will be noted that the end of each finger 381 and the under face of the lug 380 are beveled so that when a key is just partially depressed at the time the respective link is about to be elevated, the beveled faces cooperate to move the link positively to either its forward or rear position.

What I claim is:

1. In a machine having a shiftable carriage; a step-by-step feed means fixed on said carriage for movement therewith; traversing means for shifting said carriage and comprising a rotatable shaft, a lever means secured intermediate its ends to said shaft for cooperating with said feed means to shift said carriage one step leftward for each 180-degree revolution of said shaft in a first direction, and one step rightward for each 180-degree rotation of said shaft in a second direction, opposite said first direction, a first gear train and a second gear train connected with said shaft for rotating said shaft respectively in said first direction and said second direction; a rotatable driving unit for operating said traversing means, said driving unit comprising spaced first and second free running coaxial drive gears, each said drive gear comprising a single step interconecting two plane discoidal faces directed toward the interspace between said drive gears, said first drive gear being meshed with said first gear train and said second drive gear being meshed with said second gear train, a 360-degree revolution of a said drive gear serving to turn said shaft 180 degrees, and a single unit coupling means connected at all times with said driving unit for rotation therewith, said coupling means comprising a single step interconnecting two plane discoidal faces on each end thereof for coupling contact alternately with said first and second drive gears, said coupling means being shiftable axially for selectively coupling said first drive gear or said second drive gear with said drive unit for rotation of the coupled drive gear by said drive unit for shifting said carriage by at least one step, the number of steps corresponding to the number of rotations of said driving unit.

2. The combination as set forth in claim 1 wherein each said gear train comprises a pair of meshed scroll gears for providing a low drive ratio for the start of each step of movement of said carriage and progressively increasing higher drive ratios until said step of movement is completed.

3. In a machine a shiftable carriage; a step-by-step feed means fixed on said carriage for movement therewith; a main power supply means, and a plurality of distinct mechanisms differentially connected with said power supply means for independent operation of each of said mechanisms thereby; said plurality of distinct mechanisms comprising a carriage traversing means for shifting said carriage, said traversing means comprising a rotatable first shaft, a lever means secured intermediate its ends to said first shaft for cooperating with said feed means to shift said carriage one step leftward for each 180-degree revolution of said first shaft in a first direction, and one step rightward for each 180-degree rotation of said first shaft in a second direction, opposite said first direction, a rotatable second shaft ratio connected to said first shaft so as to turn 360-degrees for each 180-degrees rotation of said first shaft, a first gear train and a second gear train connected with said second shaft for rotating said second shaft respectively in said first direction and said second direction; a rotatable driving unit operable by said power supply means for operating said traversing means, said driving unit comprising spaced first and second free running coaxial drive gears, each said drive gear comprising a stepped discoidal face directed toward the interspace therebetween, said first drive gear being meshed with said first gear train and said second drive gear being meshed with said second gear train; a single unit coupling means connected at all times with said driving unit for being rotated therewith, said coupling means being shiftable axially for selectively coupling said first drive gear or said second drive gear with said drive unit for rotation of the coupled drive gear by said drive unit for shifting said carriage, and a governing means mounted on said second shaft and responsive to centrifugal forces resulting from rotation of said second shaft for controlling the rate of operation of said traversing means exclusively when rotative speeds thereof tend to exceed a predetermined magnitude.

4. The combination as set forth in claim 3 wherein each said gear train comprises a pair of meshed scroll gears constructed and arranged so as to provide a low drive ratio for the start of each step of movement of said carriage and progressively increasing higher drive ratios until said step of movement is completed.

5. In a machine having a shiftable carriage; the combination of a step-by-step feed means fixed on said carriage; a traversing means comprising a rotatable shaft, lever means secured to said shaft and cooperating with said feed means to shift said carriage, and gear means for rotating said shaft in one direction and in the opposite direction; a rotatable driving unit for operating said traversing means, said driving unit comprising a pair of free running coaxial drive gears meshed with said gear means, one said drive gear for effecting rotation of said shaft in said one direction and the other said drive gear for effecting rotation of said shaft in said opposite direction in a 360-degree revolution of a said drive gear, each said drive gear comprising a single step interconnecting two plane discoidal faces directed toward the interspace between said drive gears, and a coupling means mounted coaxially with and between said drive gears on said driving unit for rotation therewith, said coupling means comprising a single step interconnecting two plane discoidal faces on each end thereof for mating contact alternately with the corresponding said faces of said first and second drive gears, said coupling means being shiftable axially for coupling said drive gears selectively one at a time with said driving unit.

6. In a machine having a shiftable carriage, the combination of feed means fixed on said carriage, a traversing means comprising rotatable lever means cooperating with said feed means to shift said carriage, gear means for operating said lever means to shift said carriage selectively in one direction and in the opposite direction, and a driving unit for operating said traversing means, said driving unit comprising a pair of free running coaxial drive gears meshed with said gear means, one said drive gear for rotating said gear means in one direction and the other said drive gear for rotating said gear means in the opposite direction, each said drive gear comprising a single step interconnecting two plane discoidal faces directed toward the interspace between said drive gears and a coupling means engaged at all times with said driving unit for rotating therewith, said coupling means being shiftable axially and mounted coaxially with and between said drive gears on said driving unit for rotation therewith, said coupling means comprising a single step interconnecting two plane discoidal faces on each end thereof for mating contact alternately with the corresponding said faces of each of said pair of drive gears for connecting said drive gears selectively, one at a time with said driving unit.

7. In a machine having an ordinally shiftable carriage; a step-by-step feed means fixed on said carriage for movement therewith, said feed means having open end slots perpendicular to the shift of said carriage; traversing means for shifting said carriage and comprising a rotatable first shaft, a lever means secured intermediate its ends to said first shaft and carrying roller means on each of its said ends, both said roller means normally standing in engagement with an adjacent pair of said slots for locking said feed means and said carriage in an ordinal position, a rotary driving unit operable one revolution for each ordinal step shift of said carriage, a second rotatable shaft and reduction gearing between said second shaft and said first shaft for turning said first shaft one half of a revolution for each revolution of said second shaft, and a pair of intermeshed scroll gears connecting said driving unit with said second shaft for turning said second shaft one revolution with increased power to start and progressively decreasing power and increasing speed during each revolution of said driving unit, whereby said scroll gears provide multiplied power to start and gradually accelerate, said reduction gearing provides multiplication of the power of said driving means, and said lever means and said roller means acting in said perpendicular slots provide further multiplied power to start, gradually advance to direct drive and then gradually decelerate the shift of said feed means for shifting said carriage quickly and positively from one ordinal position to another.

8. In a machine, a shiftable carriage, cycling means for shifting said carriage stepwise from one position to the next adjacent position selectively in one direction and in the opposite direction, in each cycle of operation of said cycling means, stop-start means operable for initiating and stopping operation of said cycling means, thrust means carried by said carriage for movement therewith, tabulating means operable by said thrust means on shifting of said carriage into either end-most position and being selectively presettable for operation by said thrust means on shift of said carriage into any of its said positions in between said end-most positions to effect actuation of said stop-start means to stop operation of said cycling means so as to arrest said carriage upon completion of the shift of said carriage respectively to the particular end-most position and, when selection is made of an intermediate position, to that position, said tabulating means comprising a plurality of key means, each movable individually to operated position and being individual to a different one of said intermediate positions, a transverse member slidable endwise, a plurality of equally spaced stop-inducing means carried on said transverse member for moving endwise together with said member, each said stop-inducing means being individual to a different axial position of said carriage, said stop-inducing means individual to said end-most positions at all times standing in the path of movement of said thrust means and being secured against rocking out of said path, for effecting endwise movement of said transverse member upon shift of said carriage into the related position, and said stop-inducing means individual to said intermediate positions being rockable relative to said transverse member and normally retracted from out of said path of movement of said thrust means, spring means between each rockable stop-inducing means and its related key means for rocking said stop-inducing means into said path of movement of said thrust means subsequent to movement of said key means to operated position, a normally inoperable holding means common to all said rockable stop-inducing means for holding any selected stop-inducing means retracted, said normally inoperable holding means being engageable with said cycling means for actuation thereby to operated position for permitting any selected rockable stop-inducing means to be rocked into the path of movement of said thrust means for effecting endwise movement of said transverse member when said carriage shifts into the respective selected carriage position, control means operable on said holding means for effecting engagement of said holding means with said cycling means, said control means also being for operation on said stop-start means to initiate operation of said cycling means, and means responsive to said endwise movement of said transverse member for rendering said stop-start means effective to stop said cycling means at the completion of the cycle of operations in which endwise movement of said transverse member occurs, thereby to stop said carriage at the completion of the shift to the position relative to the said thrust means actuated stop-inducing means.

9. In a machine, a shiftable carriage, cycling means in continuous engagement with said carriage for shifting said carriage stepwise from one position to a next adjacent position, selectively in one direction and in the opposite direction, in each cycle of operation of said cycling means, and a stop-start means operable for initiating and stopping operation of said cycling means, in combination with actuating means operable on said stop-start means during any single step shift of said carriage to effect stopping of said cycling means at the completion of said cycle of operation for that shift, thrust means carried by said carriage for movement therewith, a plurality of spaced stop-inducing means carried on said actuating means for movement together with said actuating means, each said stop-inducing means being individual to a different said position of said carriage, said stop-inducing means individual to the end-most positions of said carriage being secured against rocking and at all times standing in the path of movement of said thrust means for being engaged and moved by said thrust means upon shift of said carriage into the related end-most position, and said stop-inducing means individual to said positions of said carriage intermediate said end-most positions being rockable and normally retracted from out of the path of movement of said thrust means, a rockable member individual to and engaging each rockable stop-inducing means for rocking said stop-inducing means into the path of movement of said thrust means upon rocking of said rockable member, a rockable stop-inducing means so rocked being then engageable and movable by said thrust means upon movement of said carriage into the related position, a lever means individual to and coaxial with each rockable member, said lever means being movable selectively to operated position, spring means connected to said lever means and its related rockable member for said rocking of said rockable member subsequent to movement of the related said lever means to said operated position, a bail means coaxial with said rockable members and normally engaging each rockable member for temporarily preventing rocking of any said rockable member by its said spring means in response to actuation of its related lever means, bail motivating means normally disengaged from said cycling means for rotating said bail means to permit said rocking of said spring biased rockable member upon engagement and actuation of said motivating means with said cycling means, and control means operable on both said motivating means and said stop-start means for engaging said motivating means with said cycling means and for actuating said stop-start means to initiate operation of said cycling means.

10. In a machine, a shiftable carriage, cycling means in continuous engagement with said carriage for shifting said carriage step wise from one position to the next adjacent position in each cycle of operation of said cyclic means and a stop-start means operable for initiating and stopping operation of said cycling means, in combination with actuating means operable on said stop-start means during any single step shift of said carriage to effect stopping of said cycling means at the completion of said cycle of operation for that shift, a plurality of stop-inducing means carried by said actuating means for movement together with said actuating means, each said stop-inducing means being individual to a different said position of said carriage, said stop-inducing means individual to the two end-most positions of said carriage being fixed against rocking and at all times standing in the path of movement of said carriage, and all other said stop-inducing means being rockable from a normally retracted position into the path of movement of said carriage, so that a said stop-inducing means standing in the path of said carriage is engaged and moved by said carriage upon movement of said carriage into said related position, tensionable spring biased rocking means individual to and engaging each rockable stop-inducing means for selectively rocking its said stop-inducing means into the path of movement of said carriage, a normally inoperable holding means common to and engaging all said rocking means for normally holding any tensioned rocking means against responding to spring bias, said holding means being engageable with said cycling means for being moved by said cycling means to operated position thereby to permit rocking of any tensioned rocking means, and control means operable on both said holding means for engaging said holding means with said cycling means and on said stop-start means to initiate operation of said cycling means.

11. In a machine, a shiftable carriage, cycling means in engagement with said carriage for shifting said carriage stepwise from one position to the next adjacent position in each cycle of operation of said cycling means and a stop-start means operable for initiating and stopping operation of said cycling means, actuating means operable on said stop-start means during any single step shift of said carriage to effect stopping of said cycling means at the completion of the cycle of operation for that shift, a rockable stop-inducing means for each position of said carriage and rockable into the path of said carriage for being engaged and moved transversely by said carriage upon movement of said carriage into the related position, each stop-inducing means being connected with said actuating means for operating said actuating means when said stop-inducing means is moved transversely, selectively presettable resilient means for rocking the related stop-inducing means into the path of movement of said carriage, holding means common to and engaging all said resilient means for normally constraining any preset said resilient means from rocking said related stop-inducing means, said holding means being engageable with said cycling means for being moved by said cycling means to operated position, movement of said holding means to operated position permitting any preset resilient means to effect said rocking of the related stop-inducing means.

12. The construction according to claim 11 wherein each said resilient means comprises a rockable member coupled with its related stop-inducing member for rocking the same, a key member for each rockable member and movable from rest position to operated position, a spring connected to each key member and its related rockable member so that when said key member is in operated position, the associated rocking member is tensioned by its said spring for said rocking of said related stop-inducing means, said holding means engaging said rocking members for constraining any tensioned rocking member until movement of said holding means to operated position is effected.

13. The construction according to claim 11 wherein said holding means comprises a rockable bail means engaging said resilient means for said constraint of any preset resilient means, and linkage means connected to said bail means and engageable with said cycling means for said movement of said bail means by said cycling means.

14. The construction according to claim 11 wherein said cycling means comprises a rotatable cam having a major and a minor radius peripheral portion, and said holding means comprises a rockable bail member engaging all said resilient means for said constraint of any preset resilient means, link means pivoted at one of its ends on said bail member for being rockable relative to said bail member and for rocking said bail member upon rectilinear movement of said link means, a first stud secured on the other end of said link means, latch means pivoted on said first stud, a lug integral with said latch means and engaging said link means for normally blocking rocking of said latch means in a first direction relative to said link means so that said link means and latch means are movable together angularly in said first direction and rectilinearly, pivoted follower means comprising a first and a second arm, a roller on said first arm normally retracted from contact with said cam periphery, a cam slot formed generally radially on said second arm, said first stud engaging said second arm in said cam slot normally at the distal end of said cam slot, said cam slot being so formed that on movement of said link means in said first direction said first stud rocks said cam follower toward said cam for engaging said roller with said cam periphery at said minor radius portion, then upon rotation of said cam said major radius portion swings said follower outwardly, moving said link means rectilinearly, a stationary second stud standing in the path of said rectilinear movement of said latch means for engagement of said latch means with said second stud for holding said link means and therethrough said bail means in operated position, a tensioned spring connected to said follower means and said latch means for moving said link means and said latch means in said first direction, said control means disengaging said latch means and normally holding said link means at rest position against the tension of said spring.

15. The construction according to claim 14 wherein said control means comprises a pivoted bellcrank contacting said link means for effecting said disengagement of said latch means from said second stud and rocking said link means opposite to said first direction to rest position and holding said link means at rest position against the tension of said first spring, an anchored second spring connected to said bellcrank for rotating said bellcrank to effect said return of said link to rest position, and selectively operable means for rotating said bellcrank against the bias of said second spring and for said actuation of said stop-start means.

16. In a machine, the combination of a shiftable carriage, cycling means in continuous drive engagement with said carriage for shifting said carriage stepwise from one position to a next adjacent position in each cycle of operation of said cycling means, stop-start means operable for initiating and stopping operation of said cycling means, and tabulating means responsive to said carriage upon movement of said carriage into an end-most position and selectively responsive to said carriage upon movement of said carriage into a preselected position between the end-most positions for actuating said stop-start means to stop said cycling means at the completion of the cycle of operation for the shift into the involved position, said tabulating means comprising a plurality of selection keys, one for each said position between said end-most positions and movable to operated position for rendering said tabulating means responsive to said carriage at the respective position, and wherein each said key is formed with a notch, and including locking means constructed and arranged with flexible comb-like hook fingers individually yieldable upon depression of a respective said key and a consecutively depressed key or keys for engaging said notch thereof and holding said key or keys in operated position.

17. The combination according to claim 16 wherein said locking means is mounted for turning about a longitudinal axis spaced from the hook portions of said fingers and said locking means is turnable for removing all said hook fingers from said notches of any operated said keys.

18. The combination according to claim 16 and comprising clearing means operable on said locking means for moving said locking means to disengage from any selection key in operated position thereby to permit return of any said operated selection key to normal position.

19. In a machine, the combination of a shiftable carriage, cycling means in continuous drive engagement with said carriage for shifting said carriage stepwise from one position to the next adjacent position in each cycle of operation of said cycling means, stop-start means operable for initiating and stopping operation of said cycling means, and tabulating means responsive to said carriage upon movement of said carriage into an end-most position and selectively responsive to said carriage upon movement of said carriage into a preselected position between the end-most positions, for actuating said stop-start means to stop said cycling means at the completion of the cycle of operation for the shift into the involved position, said tabulating means comprising a plurality of selection keys, one for each said position between said end-most positions and movable to operated position for rendering said tabulating means responsive to said carriage at the respective position, and wherein each selection key comprises a rockable lever member formed with a notch on an end portion thereof, and a first spring means individual to each lever member for normally holding said lever member at rest position; locking means for said selection keys for holding a selection key in operated position, said locking means comprising an elongated member rockably mounted in transverse relation to said lever members, said elongated member being formed with a plurality of spaced flexible hook means each individual to and contacting a lever member, a second spring means for yieldably holding said elongated member at rest position, in which position said hook means are flexed so that on movement of a lever member to operated position the related hook means snaps into said notch for holding said lever member in said operated position, and rockable clear-key means engaging said elongated member for rocking said elongated member against the tension of said second spring to disengage any hook means engaging its related notch to permit the associated lever member to return to rest position.

20. In a machine, the combination of a shiftable register carriage, cycling means in continuous engagement with said carriage for shifting said carriage stepwise from one ordinal position to a next adjacent ordinal position in each cycle of operation of said cycling means, stop-start means operable for initiating and stopping operation of said cycling means, and tabulating means responsive to said carriage upon movement of said carriage into an end-most position and selectively responsive to said carriage upon movement of said carriage into any preselected position between the end-most positions for actuating said stop-start means to stop operation of said cycling means and therethrough stop said carriage when said carriage completes its movement to the respective end-most or preselected position, the response of said tabulating means being an operational stroke of lesser extent than an ordinal step shift of said carriage, and a yieldable thrust means, carried by said carriage for engaging and operating said tabulating means early in the respective final cycle of said cycling means without yielding, and thereafter yielding to permit completion of the remainder of the respective step shift of said carriage.

21. In a machine, the combination of a shiftable register carriage, cycling means in continuous engagement with said carriage for shifting said carriage stepwise from one ordinal position to a next adjacent ordinal position in each cycle of operation of said cycling means, stop-start means operable for initiating and stopping operation of said cycling means, and tabulating means responsive to said carriage upon movement of said carriage into an end-most position and selectively responsive to said carriage upon movement of said carriage into any preselected position between the end-most positions for actuating said stop-start means to stop operation of said cycling means and therethrough stop said carriage when said carriage completes its movement to the respective end-most or preselected position, the response of said tabulating means being an operational stroke of lesser extent than a step shift of said carriage, and a yieldable thrust means, carried by said carriage for engaging and operating said tabulating means early in the respective final cycle of said cycling means without yielding, and thereafter yielding to permit completion of the remainder of the respective step shift of said carriage, said thrust means comprising a slide member slidable relative to said carriage, a normal position stop fixed on said carriage for locating said slide member positionally relative to said carriage, and resilient means for holding said slide member at normal position in contact with said stop, for operating said tabulating means upon engagement therewith and thereafter permitting said slide member to slide as the carriage completes the involved step shift.

22. In a machine comprising a carriage selectively shiftable in a first direction and a second direction, opposite said first direction, the combination of a cycling means for shifting said carriage stepwise from one position to a next adjacent position in each cycle of operation of said cycling means stop-start means operable for initiating operations and stopping operation of said cycling means at the end of a cycle, thereof, a rod fixed on said carriage for movement therewith, a yieldable thrust means carried by said rod for movement therewith, and tabulating means responsive to said yieldable thrust means and operable a lesser limited extent than the extent of a step shift of said carriage upon approach of said carriage into either end-most position and selectively responsive to said thrust means upon approach of said carriage into a preselected position between said end-most positions, for actuating said stop-start means to stop operation of said cycling means when said carriage completes its movement to the respective end-most or preselected position, said thrust means comprising a pair of spaced annular rings fixed on said rod against axial displacement therealong, first and second slide members mounted slidably on said rod between said annular rings and spring means between said slide members for normally yieldably holding said slide members apart against the respective annular rings said first slide member serving to actuate said tabulating means when said carriage is moved in said first direction into a preselected position or the respective end-most position, and said second slide member serving to actuate said tabulating means when said carriage is moved in said second direction to a preselected position or the respective end-most position, the involved slide member actuating said tabulating means said limited extent whereupon said spring yields, permitting said slide member to slide on said rod while said carriage completes the respective step of movement.

23. In a machine comprising a carriage selectively shiftable in a first direction and a second direction, opposite said first direction, the combination of a cycling means for shifting said carriage stepwise from one position to a next adjacent position in each cycle of operation of said cycling means, stop-start means operable for initiating operations and stopping operation of said cycling means at the end of a cycle thereof, a rod fixed on said carriage for movement therewith, a yieldable thrust means carried by a said rod for movement therewith, and tabulating means responsive to said yieldable thrust means and operable a lesser limited extent than the extent of a step shift of said carriage upon approach of said carriage into either end-most position and selectively responsive to said thrust means upon approach of said carriage into a preselected position between said end-most positions, for actuating said stop-start means to stop operation of said cycling means when said carriage completes its movement to the respective end-most or preselected position, said thrust means comprising a pair of spaced annular rings fixed on said rod against axial displacement therealong, first and second annular slide members mounted slidably on said rod between said annular rings, spring means between said slide members for normally yieldably holding said slide members apart against the respective annular rings, a cylindrical casing slidably supported on both said bearings and being formed inwardly on its ends to embrace both said bearings for preventing random sliding of said casing and for uniformly moving the respective said slide member against the tension of said spring means, a first end of said casing and said first slide member serving to operate said tabulating means when said carriage is moved in said first direction into a preselected position or the respective end-most position, and a second end of said casing and said second slide member serving to operate said tabulating means when said carriage is moved in said second direction to a preselected position or the respective end-most position, the cylindrical casing and the involved slide member operating said tabulating means said limited extent whereupon said spring yields, permitting said cylindrical casing to slide on the unaffected said slide member and the involved said slide member to slide on said rod against the tension of said spring while said carriage completes the respective step of movement.

24. In a machine comprising a shiftable carriage, traversing means comprising a normally operable first means for shifting said carriage in one direction and a normally inoperable second means for shifting said carriage in the opposite direction when said second means is rendered operable and said first means is rendered inoperable, initiating means operable for instituting operation of said traversing means, change direction means operable for rendering said first means inoperable and said second means operable, control means movable for actuating said initiating means, a normally ineffective actuating means comprising a member movable by said control means and pawl means carried on said member for movement therewith and an optionally settable key means for moving said pawl means relative to said member into and out of engagement with said change direction means for rendering said actuating means effective for operating said change direction means upon operation of said control means.

25. In a machine comprising a shiftable carriage, traversing means for comprising a normally operable first means for shifting said carriage in one direction and a normally inoperable second means for shifting said carriage in the opposite direction when said second means is rendered operable and said first means is rendered inoperable, initiating means operable for instituting operation of said traversing means, change direction means operable for rendering said first means inoperable and said second means operable, control means movable for actuating said initiating means, actuating means comprising a pivoted member movable by said control means and normally ineffective pawl means rockably mounted on said pivoted member, an optionally settable key means for rocking said pawl means from ineffective position into engagement with said change direction means, yieldable lost motion link means interconnecting said key means and said pawl means, a substantially stationary means, and a finger carried on said link means for movement therewith and formed on its end with inclined surfaces for cooperating with said stationary means to effect movement of said pawl means positively selectively to ineffective position and to engaging position, when said pawl means is intermediate said ineffective and engaging positions inadvertently and said member is moved by said control means.

26. In a machine comprising a shiftable carriage, a main operating means and a plurality of mechanisms operable by said main operating means and including a computing mechanism and a traversing mechanism for shifting said carriage, said traversing mechanism comprising a normally operable first means for shifting said carriage in one direction and a normally inoperable second means for shifting said carriage in the opposite direction when said second means is rendered operable and said first means is rendered inoperable, change direction means operable for rendering said first means inoperable and said second means operable, each of said mechanisms except said traversing mechanism comprising actuatable automatic shift control means, a manually operable shift control means, initiating means responsive to said manual and automatic shift control means for instituting operation of said traversing mechanism by said main operating means, a normally ineffective actuating means operable by said computing mechanism and by said manual control means for operating said change direction means when said actuating means is rendered effective, said actuating means comprising a member movable by said manual control means and said computing mechanism, a pawl means carried by said member for movement with said member and movable relative to said member from rest position to effective position for engaging and actuating said change direction means when said member is moved, and a key means movable optionally from one to the other of two positions for moving said pawl means into and out of said effective position.

27. In a calculating machine comprising an ordinally shiftable register carriage, a traversing mechanism for shifting said carriage one order at a time in each cycle of operation of said traversing mechanism, said traversing mechanism comprising a normally operable first means for effecting said shift in one direction and a normally inoperable second means for effecting said ordinal shift in the opposite direction when said second means is rendered operable and said first means is rendered inoperable, change direction means operable for rendering said first means inoperable and said second means operable, a multiplying mechanism for obtaining a product and entering said product in said carriage in each cycle of operation of said multiplying mechanism, a main operating mechanism common to said multiplying and traversing mechanisms for actuating each said mechanism, a stop-start means individual to and for said multiplying mechanism and said traversing mechanism, each said stop-start means being operable to initiate and stop operation of the related mechanism, said multiplying mechanism comprising a shift control means operable thereby in each cycle of operation for actuating said shift stop-start means for an ordinal shift of said carriage subsequent to said entering of said product in said carriage, a zero multiplying key means operable on said shift stop-start means for an ordinal shift of said carriage, a return shift key means operable on said shift stop-start means to effect shift of said carriage to a pre-selectable start position, a first actuating member movable by said multiplying mechanism in synchronism with said shift control means and by said zero multiplying key means, a second actuating member movable by said return shift key means, a pawl means carried on each said actuating member for movement therewith and each pawl means being movable relative to the respective actuating member from ineffective position to effective position for engaging and actuating said change direction means upon said movement of the related actuating member, a pre-settable key means individual to and for each pawl means for moving the related pawl means from its said ineffective position to its said effective position upon movement of the related pre-settable key means respectively from normal position to operated position, spring means for each said pre-settable key means for returning the related key means from operated position to normal position, and a lock means common to said pre-settable key means for holding each said key means in its said operated position upon movement of said key means to said operated position, said lock means being responsive to movement of the other of said key means to operated position for releasing the first moved key means to return to its normal position, whereby the return shift of said carriage is in a direction opposite to the selected direction for the ordinal shifting during a multiplying computation.

28. In a calculating machine comprising an ordinally shiftable carriage, a traversing mechanism operable for shifting said carriage one ordinal step in each cycle of operation, said traversing mechanism comprising a normally operable first means for effecting said shift to be in one direction and a normally inoperable second means for effecting said shift to be in the opposite direction when said second means is rendered operable and said first means is rendered inoperable, change direction means operable for selectively rendering said first means inoperable and said second means operable, a multiplying mechanism for obtaining a product and entering said product in said register carriage selectively additively or subtractively in each cycle of operation of said multiplying mechanism, a dividing mechanism for obtaining a quotient and entering said quotient into said multiplying mechanism in each cycle of operation of said dividing mechanism for subtraction of the product of said quotient and the divisor from the dividend in said register carriage, a main operating mechanism common to said multiplying, dividing and traversing mechanisms for actuating said mechanisms, a stop-start means individual to and for said multiplying, dividing and traversing mechanisms, each stop-start means being operable to initiate and stop operation of its respective mechanism, a first control means operable by said multiplying mechanism subsequent to said entering of a product in said register carriage for actuating the shift stop-start means to initiate an ordinal shift of said carriage, a second control means operable by said dividing mechanism subsequent to said entering of a quotient in said multiplying mechanism for actuating the multiplying stop-start means to initiate a multiplying cycle of operation, a third control means operable by said traversing mechanism during the final phase of an ordinal shift of said carriage for actuating the dividing stop-start means to initiate another dividing cycle of operation, an actuating member movable by said multiplying mechanism, a pawl means carried by said actuating member for movement therewith, said pawl member being movable relative to said actuating member from ineffective to effective position for engaging and operating said change direction member upon said movement of said actuating member, a pre-settable key means comprising a yieldable lost-motion connecting means with said pawl means for having said pawl means from said ineffective position to said effective position upon movement of said key means from normal position to operated position, and divide key means operable on said dividing stop-start means to initiate the initial dividing cycle of operation and on said yieldably lost motion connecting means for moving said pawl means, whenever it is at said effective position, back to ineffective position, said lost motion connection permitting said movement of said pawl means to ineffective position without changing the position of said pre-settable key means.

29. In a calculating machine comprising an ordinally shiftable register carriage, a multiplying mechanism for obtaining a product and entering said product selectively additively or subtractively in said register carriage in each cycle of operation of said multiplying mechanism, a dividing mechanism for obtaining a trial quotient and entering a quotient into said multiplying mechanism in each cycle of operation of said dividing mechanism for subtraction of the product of said trial quotient and the divisor from the dividend in said register carriage, a traversing mechanism for shifting said carriage ordinally in each cycle of operation of said traversing mechanism, a main operating mechanism common to said dividing, multiplying and traversing mechanisms for operating each of them, a stop-start means individual to and for said multiplying, dividing and traversing mechanisms, each stop-start means being operable to initiate and to stop operation of the respective mechanism, a first control means operable by said dividing mechanism on the multiplying stop-start means to initiate a multiplying cycle of operation subsequent to entering of the trial quotient into said multiplying mechanism, a second control means normally engaged with the shift stop-start means and operatable by said multiplying mechanism to effect an ordinal shift of said carriage subsequent to entry of the product into said carriage, a third control means operably by said traversing mechanism on the dividing stop-start means to initiate a dividing cycle of operation subsequent to completion of such ordinal shift of said carriage, multiplying key means operable on said multiplying stop-start means to initiate a multiplying cycle of operation, a pre-settable key means comprising a yieldable lost motion connecting means with said second control means for disengaging said second control means from said shift stop-start means upon movement of said key means from normal to operated position, thereby to prevent initiation of an automatic ordinal shift during multiplying computations, and a divide key means operable on said dividing stop-start means to initiate the initial dividing cycle of operation, said divide key means also being operable on said lost motion connecting means, when said pre-settable key means is in operated position, to effect re-engagement of said second control means with said carriage shift stop-start means without changing the position of said pre-settable key means.

30. In a calculating machine comprising an ordinally shiftable register carriage, a multiplying mechanism for obtaining a product and entering said product in said register carriage in each cycle of operation of said multiplying mechanism, a traversing mechanism for shifting said carriage one ordinal step in each cycle of operation of said traversing mechanism, said traversing mechanism comprising a normally operable first means for said shifting of said carriage in one direction and a normally inoperable means for said shifting of said carriage in the opposite direction when said second means is rendered operable and said first means is rendered inoperable, change direction means operable for rendering said first means inoperable and said second means operable, a main operating mechanism common to said multiplying and traversing mechanisms for operating said multiplying and traversing mechanisms, a stop-start means individual to and for said multiplying and traversing mechanisms, each stop-start means being operable to initiate and to stop operation of the related mechanism, a control means normally engaging the shift stop-start means and operatable by said multiplying mechanism for actuating said shift stop-start means to effect an ordinal shift of said carriage subsequent to said entry of a product, multiplying key means operable on the multiplying stop-start means for actuating said multiplying stop-start means to initiate operation of said multiplying mechanism, a zero multiplying key means normally engaging with said shift stop-start means for operating said shift stop-start means to initiate a shift operation, a return shift key means normally engaging said shift stop-start means and said change direction means for actuating said shift stop-start means and said change direction means to effect a shift of the carriage in said opposite direction as to a start position, and a pre-settable key means connected to said control means, to said zero multiplying key means and to said return shift key means for disengaging each from said shift stop-start means upon movement of said pre-settable key means from normal position to operated position thereby to prevent automatic or manual initiation of a shift operation during certain multiplying computations.

31. In a calculating machine comprising an ordinally shiftable register carriage, a multiplying mechanism for obtaining a product and entering said product in said register carriage in each cycle of operation of said multiplying mechanism, a traversing mechanism for shifting said carriage one ordinal step in each cycle of operation of said traversing mechanism, a main operating mechanism common to said multiplying and traversing mechanisms for operating said multiplying and traversing mechanisms, a stop-start means individual to and for said multiplying mechanism and traversing mechanism, each stop-start means being operable in initiate and to stop operation of the related mechanism, an engageable and disengageable control means normally engaged with the shift stop-start means and operatable by said multiplying mechanism to actuate said shift stop-start means to effect an ordinal shift of the carriage subsequent to entering a product, multiplying key means operable on the multiplying stop-start means to initiate a cycle of operation of said multiplying mechanism, an engageable and disengageable "0" multiplying key means normally engaged with said shift stop-start means and optionally operable for actuating said shift stop-start means to initiate an ordinal shift of said register carriage, and a pre-settable key means connected to said control means and to said "0" multiplying key means for disengaging each upon movement of said pre-settable key means from normal position to operated position thereby to prevent automatic or manual initiation of a shift operation during certain multiplying computations.

32. A pre-settable tabulating mechanism for optionally limiting the number of quotient digits to be obtained by a dividing machine comprising an ordinally shiftable carriage, multiorder dividend and quotient registers on said carriage, traversing device for shifting said carriage an ordinal step in each cycle of operation, a multiplying device operable to enter a dividend in the register therefor, and operable to subtract the product of each quotient digit and the divisor from the dividend and enter the quotient digit in the register therefor in each cycle of operation, a dividing device for obtaining a quotient digit of the dividend and divisor, and enter said quotient digit into computation in said multiplying device in each cycle of operation of said dividing device, a main operating mechanism for actuating said devices, a stop-start means individual to and for each device and operable to initiate and to stop actuation of its respective device, a first means actuated by said dividing device upon entry of a quotient digit in said multiplying device for actuating the multiplying stop-start means to initiate a multiplying cycle of operation a second means normally engaged with said shift stop-start means and operable by said multiplying device subsequent to subtraction of the product from the dividend for actuating the shift stop-start means to initiate an ordinal shift of said carriage, a third means normally disengaged from the divide stop-start means and operable by said traversing device at the completion of each ordinal shift of said carriage for actuating said divide stop-start means to initiate another dividing cycle of operation when said third means is engaged with said divide stop-start means, and divide key means operable on said divide stop-start means to initiate the initial cycle of dividing operation and to engage said third means with said divide stop-start means, said tabulating mechanism comprising a slide member movable endwise, a plurality of stop-inducing members, each individual to a different ordinal position of said carriage and carried on said slide member for movement therewith endwise, said stop-inducing members being rockable relative to said slide member and normally retracted from out of the path of said carriage, selective presettable tabulating key means, each individual to a different stop-inducing member for rocking its related stop-inducing member into the path of said carriage for endwise movement of said slide member by said carriage when said carriage shifts into the respective ordinal position, and linkage means actuated by said slide member for disengaging said second means from said shift stop-start means, thereby preventing initiation of a shift cycle of operation subsequent to subtraction of the ensuing product from the dividend and entry of the involved quotient digit in the order of said quotient register corresponding to the preset tabulating key means, and all machine operations terminate.

33. In a calculating machine, an ordinally shiftable register carriage, an abutment means carried by said carriage in a particular position relative to the ordinal positions of said registers in said carriage, and movable with said carriage cycling means continuously drive connected with said carriage for shifting said carriage from one ordinal position to another in each cycle of operations of said cycling means, stop-start means operable from a normal position for releasing said cycling means for operation and returnable to normal position for stopping the operation of said cycling means, and tabulating means engageable with and directly responsive to said abutment means upon movement of said carriage into an end-most ordinal position and selectively engageable with and selectively responsive to said abutment means upon movement of said carriage into any preselected intermediate ordinal position between said endmost ordinal positions for returning said stop-start means to its said normal position for stopping the operation of said cycling means when said carriage completes its movement to the respective end-most or preselected ordinal position.

34. The combination of an ordinally shiftable carriage, cycling means in continuous drive engagement with said carriage for shifting said carriage ordinally from one position to a next adjacent position in each cycle of operation of said cycling means, a fully cycle stop-start means operable from a normal position for initiating operation of said cycling means and returnable to said normal position for stopping said cycling means at the end of a cycle, and tabulating means comprising an abutment means carried by said carriage for movement therewith, a movable member mounted for longitudinal movement parallel to the ordinal shift of said carriage, linkage means interconnecting said movable member and said stop-start means for returning said stop-start means to said normal position for stopping said cycling means upon longitudinal movement of said movable member, and a plurality of selectively operable stop initiating members mounted on said movable member for movement therewith and located longitudinally therealong in individual ordinal relationship to said abutment means, each said stop initiating member being mounted for individual movement, in a plane perpendicular to the movement of said movable member, from an ineffective normal position to an operated position wherein said abutment means moves an operated stop initiating member and said movable member upon movement of said carriage into a corresponding ordinal position for terminating the shift of said carriage in that ordinal position at the completion of the current cycle of said cycling means.

References Cited in the file of this patent

UNITED STATES PATENTS

| | | |
|---|---|---|
| 1,135,500 | Chapin | Apr. 13, 1915 |
| 1,312,091 | Arter | Aug. 5, 1919 |
| 1,895,848 | Gubelmann | Jan. 31, 1933 |
| 2,216,636 | Webb | Oct. 1, 1940 |
| 2,297,243 | Pott | Sept. 29, 1942 |
| 2,365,324 | Avery | Dec. 19, 1944 |
| 2,502,321 | Harrison | Mar. 28, 1950 |
| 2,527,990 | Gang | Oct. 31, 1950 |
| 2,529,810 | Moody | Nov. 14, 1950 |
| 2,531,207 | Gang | Nov. 21, 1950 |
| 2,636,678 | Matthew | Apr. 28, 1953 |